(12) United States Patent
Ma

(10) Patent No.: US 12,253,673 B2
(45) Date of Patent: Mar. 18, 2025

(54) OPTICAL WAVEGUIDE ELEMENT AND CONTROL METHOD THEREOF, DISPLAY DEVICE AND DISPLAY METHOD THEREOF

(71) Applicant: BOE TECHNOLOGY GROUP CO., LTD., Beijing (CN)

(72) Inventor: Sen Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1088 days.

(21) Appl. No.: 17/263,586

(22) PCT Filed: May 18, 2020

(86) PCT No.: PCT/CN2020/090821
§ 371 (c)(1),
(2) Date: Jan. 27, 2021

(87) PCT Pub. No.: WO2020/233543
PCT Pub. Date: Nov. 26, 2020

(65) Prior Publication Data
US 2021/0311313 A1    Oct. 7, 2021

(30) Foreign Application Priority Data

May 21, 2019    (CN) .......................... 201910424358.X

(51) Int. Cl.
*G02B 27/01*    (2006.01)
*G02B 27/00*    (2006.01)
(Continued)

(52) U.S. Cl.
CPC ..... *G02B 27/0172* (2013.01); *G02B 27/0179* (2013.01); *G02B 27/4205* (2013.01);
(Continued)

(58) Field of Classification Search
CPC ............ G02B 27/0172; G02B 27/0179; G02B 27/4205; G02B 27/44; G02B 27/0093; G02B 27/0178; G02B 27/0187
(Continued)

(56) References Cited

U.S. PATENT DOCUMENTS 8,548,290 B2    10/2013    Travers et al.
9,470,896 B2    10/2016    Dobschal et al.
(Continued)

FOREIGN PATENT DOCUMENTS

CN    104025121 A    9/2014
CN    106338832 A    1/2017
(Continued)

OTHER PUBLICATIONS

First office action issued in Chinese Patent Application No. 201910424358.X with search report.

*Primary Examiner* — Jerry L Brooks
(74) *Attorney, Agent, or Firm* — Chiwin Law LLC

(57) ABSTRACT

An optical waveguide element, a control method of the optical waveguide element, a display device and a display method of the display device are provided. The optical waveguide element includes an optical waveguide layer and a first grating, the first grating overlaps with the optical waveguide layer and includes at least one first sub-grating unit, the at least one first sub-grating unit is configured to be switchable between a diffraction state and a non-diffraction state, and the at least one first sub-grating unit in a diffraction state guides incident light in the optical waveguide layer out of the optical waveguide layer for display. The optical waveguide element is capable of adjusting the position of the light-exiting region, the utilization rate of light is high.

18 Claims, 11 Drawing Sheets

(51) Int. Cl.
  *G02B 27/42* (2006.01)
  *G02B 27/44* (2006.01)
(52) U.S. Cl.
  CPC .......... *G02B 27/44* (2013.01); *G02B 27/0093* (2013.01); *G02B 2027/0178* (2013.01); *G02B 2027/0187* (2013.01)
(58) Field of Classification Search
  USPC ........................................................ 359/630
  See application file for complete search history.

(56) References Cited

U.S. PATENT DOCUMENTS

| | | | |
|---|---|---|---|
| 11,009,710 B2 | 5/2021 | Tekolste et al. | |
| 2016/0328016 A1 | 11/2016 | Andersson et al. | |
| 2018/0284884 A1* | 10/2018 | Sulai | G06F 3/013 |
| 2019/0113303 A1 | 4/2019 | Johnson et al. | |
| 2019/0379868 A1 | 12/2019 | Lin et al. | |

FOREIGN PATENT DOCUMENTS

| | | | |
|---|---|---|---|
| CN | 106707518 A | 5/2017 |
| CN | 107430284 A | 12/2017 |
| CN | 108415162 A | 8/2018 |
| CN | 108681067 A | 10/2018 |
| CN | 109407317 A | 3/2019 |
| CN | 110146989 A | 8/2019 |
| JP | 2006215186 A | 8/2006 |
| JP | 2013210589 A | 10/2013 |

\* cited by examiner

OPTICAL WAVEGUIDE ELEMENT AND CONTROL METHOD THEREOF, DISPLAY DEVICE AND DISPLAY METHOD THEREOF

This application is a U.S. National Phase Entry of International Application No. PCT/CN2020/090821 filed on May 18, 2020, designating the United States of America and claiming priority to Chinese Patent Application No. 201910424358.X, filed on May 21, 2019. The present application claims priority to and the benefit of the above-identified applications and the above-identified applications are incorporated by reference herein in their entirety.

TECHNICAL FIELD

At least one embodiments of the present disclosure relates to an optical waveguide element, a control method of the optical waveguide element, a display device and a display method of the display device.

BACKGROUND

Augmented Reality (AR) display device can display virtual image information while fusing the real background environment, which realizes the organic combination of virtual and reality. Therefore, it has been widely used in many fields, such as simulation training, video games, microscopy, surgery and so on. However, in the current AR display device, the optical system for projection display uses a plurality of complex lens groups, which makes the structure of the display device complex, and the weight and volume of the display device are too large to meet the needs of users.

SUMMARY

At least one embodiment of the present disclosure provides an optical waveguide element, the optical waveguide element comprises: an optical waveguide layer; a first grating, overlapping with the optical waveguide layer and comprising at least one first sub-grating unit, the at least one first sub-grating unit is configured to be switchable between a diffraction state and a non-diffraction state, and the at least one first sub-grating unit in a diffraction state guides incident light in the optical waveguide layer out of the optical waveguide layer for display, a plurality of first sub-grating units are provided, each of the plurality of first sub-grating units comprises a first control electrode to control a state of the first sub-grating unit, and the first control electrodes of at least two of the plurality of first sub-grating units are independent of each other.

For example, in the optical waveguide element provided by at least one embodiment of the present disclosure, the first control electrodes of the plurality of first sub-grating units are independent of each other.

For example, in the optical waveguide element provided by at least one embodiment of the present disclosure, in a direction parallel to a plane where the optical waveguide layer is located, the first grating comprises a plurality of first strip-shaped subregions which are parallel, and each of the plurality of first strip-shaped subregions corresponds to one of the plurality of first sub-grating units.

For example, in the optical waveguide element provided by at least one embodiment of the present disclosure, a width of each of the plurality of first strip-shaped subregions is less than or equal to a pupil diameter of a human eye.

For example, in the optical waveguide element provided by at least one embodiment of the present disclosure, the first grating comprises a plurality of first subregions arranged in a matrix, and each of the plurality of first subregions corresponds to one of the plurality of first sub-grating units.

For example, in the optical waveguide element provided by at least one embodiment of the present disclosure, at least one of a width and a length of each of the plurality of first subregions is less than or equal to a pupil diameter of a human eye.

For example, in the optical waveguide element provided by at least one embodiment of the present disclosure, the first control electrode comprises a first electrode and a second electrode which are opposite to each other, and each of plurality of the first sub-grating units further comprises a first spacer layer and a first electro-optic material layer between the first electrode and the second electrode, the first spacer layer comprises a plurality of first spacer strips, to define a plurality of first chambers with the first electrode and the second electrode, and the first electro-optical material layer fills the plurality of first chambers, and the first electrode and the second electrode are configured to generate an electric field after being applied with a voltage, to adjust a refractive index of the first electro-optical material layer.

For example, the optical waveguide element provided by at least one embodiment of the present disclosure further comprises: a second grating overlapping with the optical waveguide layer and comprising a plurality of second sub-grating units, each of the plurality of second sub-grating units is configured to be switchable between a diffraction state and a non-diffraction state, and each of the plurality of second sub-grating units is configured to guide the incident light in the optical waveguide layer from the optical waveguide layer to the first grating under a condition of being in the diffraction state.

For example, in the optical waveguide element provided by at least one embodiment of the present disclosure, in a direction parallel to a plane where the optical waveguide layer is located, each of the plurality of second sub-grating units in the diffraction state changes a propagation direction of light from a first direction to a second direction by diffraction, to emit the light towards the first grating, wherein the first direction is perpendicular to the second direction.

For example, in the optical waveguide element provided by at least one embodiment of the present disclosure, along the first direction, the second grating is provided with a plurality of second subregions, each of the plurality of second subregions comprises at least one of the plurality of second sub-grating units, along the second direction, each of the plurality of second subregions corresponds to the at least one of the plurality of first sub-grating units, and the first sub-grating unit which corresponds to one of the plurality of second subregions is different from the first sub-grating unit which corresponds to other of the plurality of second subregions.

For example, in the optical waveguide element provided by at least one embodiment of the present disclosure, each of the plurality of second sub-grating units comprises a second control electrode, a second spacer layer and a second electro-optic material layer, wherein the second spacer layer comprises a plurality of second spacer strips arranged along the first direction, the second electro-optic material layer is distributed between the second spacer strips, an included angle between the second spacer strips and the first direction, and an included angle between the second spacer strips and the second direction are equal, and along the second direction, a width of the second control electrode is equal to a width of the first sub-grating unit which corresponds to the second control electrode.

For example, in the optical waveguide element provided by at least one embodiment of the present disclosure, the first grating comprises a plurality of first subregions arranged in an array, each of the plurality of first subregions corresponds to one of the plurality of first sub-grating units, the first grating is a two-dimensional grating and the second grating is a one-dimensional grating.

At least one embodiment of the present disclosure provides a display device comprising the optical waveguide element as mentioned above.

For example, the optical waveguide element provided by at least one embodiment of the present disclosure further comprises an image providing device, the image providing device is configured to provide light to the optical waveguide for displaying an image.

For example, the optical waveguide element provided by at least one embodiment of the present disclosure further comprises a tracking device configured for detecting a position and an observation direction of a pupil, an information processing unit configured for determining an observation range of a pupil according to the position and the observation direction of the pupil to determine the first sub-grating units corresponding to the observation range of the pupil.

For example, the optical waveguide element provided by at least one embodiment of the present disclosure further comprises a control chip, the control chip is configured to be in signal connection with the information processing unit and apply a control signal to the plurality of first sub-grating units of the first grating, respectively.

For example, the optical waveguide element provided by at least one embodiment of the present disclosure further comprises an electrode control module comprising a driving circuit and configured to control voltage of electrode of the first grating and/or the second grating; a control chip connected with the tracking device, the image providing device, the information processing unit and the electrode control module, and receiving signal from the information processing unit and controlling the electrode control module, to control the first sub-grating unit of the first grating located in an effective light-exiting region to be in a diffraction state, and control the second sub-grating unit of the second grating corresponding to the effective light-exiting region to be in a diffraction state.

At least one embodiment of the present disclosure provides a control method of an optical waveguide element, wherein the optical waveguide element comprises: an optical waveguide layer; a first grating, overlapping with the optical waveguide layer and comprising at least one first sub-grating unit, the at least one first sub-grating unit being configured to be switchable between a diffraction state and a non-diffraction state; and the method comprises: controlling the first sub-grating unit of the first grating corresponding to an observation range of a pupil to be converted to be in a diffraction state, to guide incident light in the optical waveguide layer out of the optical waveguide layer to enter the pupil; and controlling the first sub-grating unit of the first grating that does not correspond to the observation range of the pupil to be converted to be in a non-diffraction state.

For example, in the control method provided by at least one embodiment of the present disclosure, the second grating comprises a plurality of second sub-grating units, in a direction parallel to a plane where the optical waveguide layer is located, the plurality of second sub-grating units are configured to change a propagation direction of light from a first direction to a second direction by diffraction, to enter the first grating, the control method comprises: controlling the second sub-grating unit that corresponds to the first sub-grating unit having a diffraction state along the second direction to be converted to be in a diffraction state, and controlling other second sub-grating unit to be converted to be in a non-diffraction state, wherein the first direction is perpendicular to the second direction.

At least one embodiment of the present disclosure provides a control method the display device as mentioned above, the display device comprises a tracking device and an information processing unit, and the display method comprises: detecting a position and an observation direction of a pupil by using the tracking device in real time; processing detection information of the tracking device by using the information processing unit to determine an observation range of the pupil in real time; controlling the first sub-grating unit of the first grating corresponding to the observation range of the pupil to be converted to be in a diffraction state, to guide incident light in the optical waveguide layer out of the optical waveguide layer to enter the pupil; and controlling the first sub-grating unit in the first grating that does not correspond to the observation range of the pupil to be converted to be in a non-diffraction state.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Figure 1A:
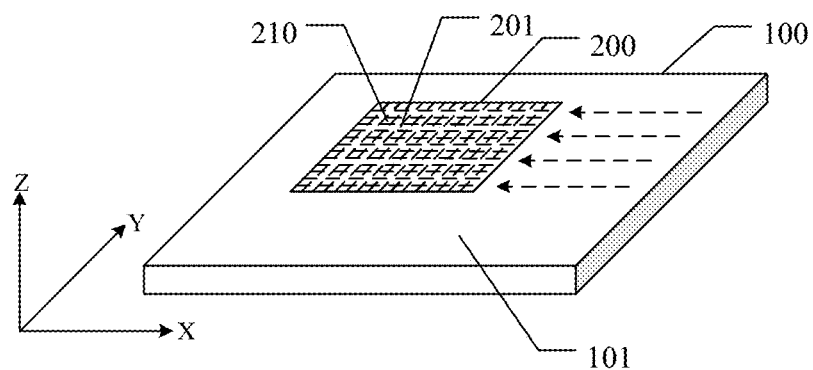
FIG. 1A illustrates a structural schematic diagram of an optical waveguide element provided by some embodiments of the present disclosure.

The reference signs in these figures comprising:

1—a first direction; 2—a second direction; 10—an optical waveguide element; 20—an image providing device; 30—a tracking device; 40—an information processing unit; 50—a control chip; 100—an optical waveguide layer; 101—a first major surface; 102—a second major surface; 200—a first grating; 201—a first subregion; 202—a first strip-shaped subregion; 210—a first sub-grating unit; 211—a first control electrode; 2111—a first electrode; 2112—a second electrode; 212—a first spacer layer; 2121—a first spacer strip; 2122—a first chamber; 213—a first electro-optic material layer; 300—a second grating; 301—a second subregion; 310—a second sub-grating unit; 311—a second control electrode; 3111—a third electrode; 3112—a fourth electrode; 312—a second spacer layer; 3121—a second spacer strip; 3122—a second chamber; 313—a second electro-optic material layer; 400—a guide-in structure.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

In an optical waveguide device, a light-exiting region of an optical waveguide emits light to enter a user's eye, thereby displaying an image. For different users, eye parameters (e.g., eye size, interpupillary distance, etc.) are different. Therefore, in practical applications, the optical waveguide device usually sets a large-sized light-exiting region to ensure that some of the emitted light can enter the human eye. Therefore, a part of the light-exiting region that allows light to enter the human eye is an effective light-exiting region, while the other part is a non-effective light-exiting region. The light from the non-effective light-exiting region is wasted because it cannot enter the human eye, that is, the light utilization rate of the optical waveguide device is low, and the brightness of the displayed image is low. In addition, the current optical waveguide device makes the light in the optical waveguide to emit out multiple times (e.g., multiple diffractions), so as to enlarge a light-exiting area. The way of making the light to emitting multiple times causes light loss, which leads to a further reduction of light utilization rate.

At least one embodiment of the present disclosure provides an optical waveguide element. The optical waveguide element includes an optical waveguide layer and a first grating, the first grating overlaps with the optical waveguide layer and comprises at least one first sub-grating unit, wherein at least one first sub-grating unit is configured to be switchable between a diffraction state and a non-diffraction state, and the first sub-grating unit in the diffraction state guides incident light in the optical waveguide layer out of the optical waveguide layer for display. When the first sub-grating unit is in the non-diffraction state, the transmission of light in the optical waveguide will not be affected, and the light will be transmitted as it is after encountering the first sub-grating unit in the non-diffraction state (for example, the total reflection condition of the light will not be destroyed). For example, the first sub-grating units is set to multiple. The first grating comprises a plurality of first sub-grating units which can be switched between the diffraction state and the non-diffraction state, so that even if the position of the eye (such as pupil) deviates from the preset position, the first sub-grating units in the region of the first grating corresponding to the pupil can be converted into the diffraction state, and the first sub-grating units in other regions can be converted into the non-diffraction state, thereby concentrating light into the first sub-grating units with the diffraction state to guide light out of the optical waveguide element. Therefore, more light will enter the human eyes, the utilization rate of light will be improved, and the brightness of the displayed image will be improved. Accordingly, the requirement on the brightness of light (displayed image) to be guided into the optical waveguide layer can be reduced, and the power consumption and heat generation of the system (such as AR glasses described below) can be reduced. In addition, in the embodiment of the present disclosure, the diffraction efficiency of the first sub-grating units can be designed to be larger when the first sub-grating units have the diffraction state (for example, the maximum diffraction efficiency can be achieved under process conditions), so that the light in the optical waveguide layer does not need to be diffracted for multiple times, which reduces the light loss. In the above process, the region where the first sub-grating units with the diffraction state are located is an effective light-exiting region, that is, with the movement and rotation of eyes (such as pupils), the position of the diffraction region (light-exiting region) of the first grating can be adjusted. In this way, in the present disclosure, the optical waveguide element (for example, the first grating) can emit light only corresponding to the eye area, while the rest positions do not emit light, and light propagates in the optical waveguide at the rest of the positions. The light can emit after being transmitted to the area corresponding to the eyes, thereby reducing the light emission from the area not corresponding to the eye, and the rest light can be transmitted to the area corresponding to the eye for emitting light, which reduces light loss and increases light emitting brightness and light utilization rate.

Next, an optical waveguide element and a control method thereof, a display device and a display method thereof according to at least one embodiment of the present disclosure will be described with reference to the accompanying drawings. In addition, a spatial rectangular coordinate system is established based on an optical waveguide layer in the optical waveguide element to explain a position of each structure in the optical waveguide element. In the spatial rectangular coordinate system, the X-axis and Y-axis are parallel to a plane where the optical waveguide layer is located, and the Z-axis is perpendicular to the plane where the optical waveguide layer is located.

In at least one embodiment of the present disclosure, as shown in FIG. 1A, the optical waveguide element includes an optical waveguide layer 100 and a first grating 200. The first grating 200 overlaps with the optical waveguide layer 100 and includes a plurality of first sub-grating units 210. Each of the plurality of first sub-grating units 210 is configured to be switchable between the diffraction state and the non-diffraction state, and the first sub-grating unit 210 in the diffraction state guides incident light in the optical waveguide layer 100 out of the optical waveguide layer 100 for display.

For example, in at least one embodiment of the present disclosure, light propagates in the optical waveguide layer in a way of total reflection, and the "diffraction state" means that the first sub-grating unit breaks the total reflection condition so that the light can be guided out of the optical waveguide layer, thus making the optical waveguide element emit light. For example, "non-diffraction state" means that the first sub-grating unit does not destroy the total reflection condition. For example, in this case, the first sub-grating unit may be equivalent to the optical waveguide layer in optical function. For example, when the first sub-grating units are in the non-diffraction state, the light in the optical waveguide layer may enter the first sub-grating units, but the light will return to the optical waveguide layer by total reflection instead of emitting from the optical waveguide element. That is, in a region where the first sub-grating unit is located, when the first sub-grating unit is in the non-diffraction state, an interface where the light is totally reflected may be transferred from a surface of the optical waveguide layer to a surface of a certain structure in the first sub-grating unit. This process may refer to the relevant description in the embodiment shown in FIG. 4, which will not be repeated here.

Figure 1B:
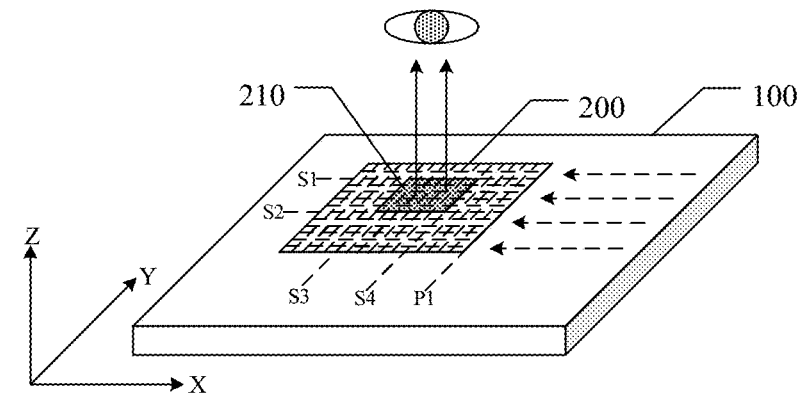
FIG. 1B illustrates a schematic diagram of the working principle of the optical waveguide element shown in FIG. 1A.

As shown in FIG. 1B, dashed lines S1 and S2 are parallel to the X-axis, dashed lines S3, S4 and P1 are parallel to the Y-axis, and a propagation direction of light (dashed arrows in FIG. 1B) emitted toward the first grating 200 in the X-Y plane is parallel to the X-axis. For example, in a case where a region defined by S1, S2, S3 and S4 is a region of the first grating 200 corresponding to the human eye (or its pupil), the first sub-grating unit 210 in the region defined by S1, S2, S3 and S4 is controlled to have the diffraction state to diffract light out of the optical waveguide layer 200 and enter the human eye, while the first sub-grating unit 210 in other regions is controlled to have the non-diffraction state and cannot diffract light out of the optical waveguide layer 100, that is, the region defined by S1, S2, S3 and S4 is an effective light-exiting region. For example, the first sub-grating unit 210 in a region between S4 and P1 has the non-diffraction state, so light will not be emitted from the region between S4 and P1, while light in other regions may be transmitted to the region defined by S1, S2, S3 and S4 to be emitted, that is, light incident from a region between S1 and S2 will be concentrated in the region defined by S1, S2, S3 and S4 to be emitted. In this way, at least in one-dimensional direction (a X-axis direction as shown in the figure), the first grating 200 can control a position of the actual light-exiting region (for example, the effective light-exiting region or including the effective light-exiting region).

In at least one embodiment of the present disclosure, there is no limitation on the manner in which the first sub-grating unit is switched between the diffraction state and the non-diffraction state. For example, a state of the first sub-grating unit may be controlled by an electric field.

For example, in the optical waveguide element provided by at least one embodiment of the present disclosure, a plurality of first sub-grating units are provided, each of the plurality of first sub-grating units includes a first control electrode to control the state of the first sub-grating unit, and the first control electrodes of at least two first sub-grating units are independent of each other. In this way, at least two first sub-grating units are not affected with each other when switching their states, thereby realizing the position adjustment of the light-exiting regions (such as effective light-exiting regions) of the first grating and the optical waveguide element. For example, the first control electrodes of the plurality of first sub-grating unit are independent of each other. In this way, each first sub-grating unit can independently generate an electric field, and the electric fields of different first sub-grating units will not interfere with each other. The structure and relevant technology to set the control electrode to generate electric field are mature, which can reduce the difficulty and cost of design.

For example, in the optical waveguide element provided by at least one embodiment of the present disclosure, the first control electrode includes two opposite electrodes, a first electrode and a second electrode, and each first sub-grating unit further includes a first spacer layer and a first electro-optic material layer located between the first electrode and the second electrode, wherein the first spacer layer includes a plurality of first spacer strips to enclose a plurality of first chambers with the first electrode and the second electrode, and the first electro-optic material layer fills the first chambers, and the first electrode and the second electrode are configured to generate an electric field after being applied with a voltage to adjust a refractive index of the first electro-optical material layer.

Figure 1C:
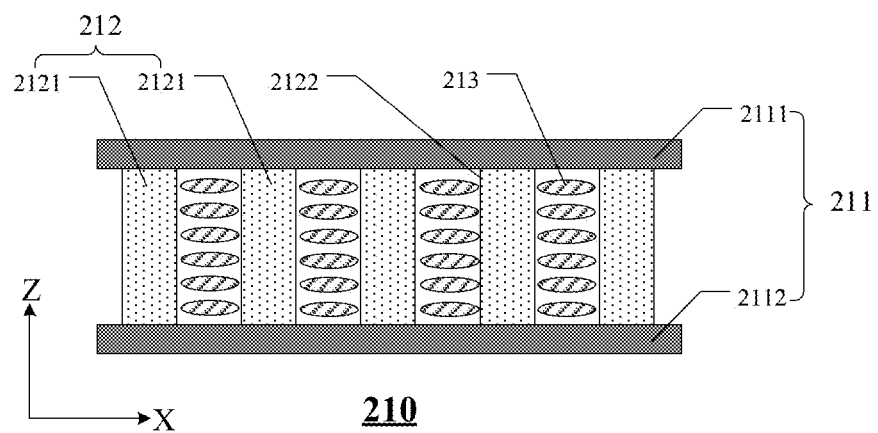
FIG. 1C illustrates a cross-sectional view of a first sub-grating unit in the optical waveguide element shown in FIG. 1A.
Figure 1D:
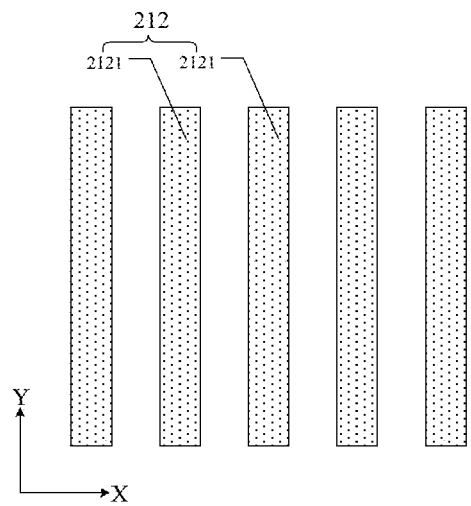
FIG. 1D illustrates a plan view of a first spacer layer of the first sub-grating unit shown in FIG. 1C.

For example, as shown in FIG. 1C and FIG. 1D, the first sub-grating unit 210 includes a control electrode 211, a first spacer layer 212 and a first electro-optic material layer 213. The control electrode 211 includes a first electrode 2111 and a second electrode 2112. The first spacer layer 212 and the first electro-optic material layer 213 are located between the first electrode 2111 and the second electrode 2112. The first spacer layer 212 is in the same layer as the first electro-optic material layer 213. The first spacer layer 212 includes a plurality of first spacer strips 2121 spaced apart from each other. Two adjacent first spacer strips 2121 and the first electrode 2111 and the second electrode 2112 enclose a first chamber 2122. The electro-optic material of the first electro-optic material layer 213 is distributed in a plurality of first chambers 2122. For example, in a normal state, the refractive index of the electro-optic material is equal to (or substantially equal to) that of the first spacer layer 212, and a structure formed by the first spacer layer 212 and the first electro-optic material layer 213 has no diffraction effect. In a case where the first electrode 2111 and the second electrode 2112 generate an electric field, the refractive index of the electro-optic material is greater or less than that of the first spacer layer 212, so that the first electro-optic material layer 213 or the first spacer layer 212 is formed into a grating structure. For example, the grating structure may be a Bragg grating.

It should be noted that, in the embodiment of the present disclosure, the relationship between the refractive index of the electro-optic material of the first electro-optical material layer and the refractive index of the first spacer layer is not limited to the above-mentioned equality under the normal condition. For example, in some embodiments of the present disclosure, in a normal state, the refractive index of the electro-optic material of the first electro-optic material layer and the refractive index of the first spacer layer are not equal to obtain a grating structure, so that the first sub-grating unit has the diffraction state; In a case where the first electrode and the second electrode generate an electric field, the refractive index of the electro-optic material of the first electro-optical material layer is equal to that of the first spacer layer, so that the first sub-grating unit has the non-diffraction state. For example, in a case where the refractive index of the electro-optic material of the first electro-optic material layer is greater than that of the first spacer layer, the first electro-optic material layer is equivalent to a grating structure to have diffraction effect, or in a case where the refractive index of the electro-optic material is less than that of the first spacer layer, the first spacer layer is equivalent to a grating structure to have diffraction effect.

In at least one embodiment of the present disclosure, the material of the first electro-optic material layer is not limited as long as its refractive index can be changed according to the change of electric field strength. For example, the material of the first electro-optic material layer may be liquid crystal, deuterated potassium dihydrogen phosphate (DKDP), ammonium dihydrogen phosphate (ADP), LT, etc. Liquid crystal materials have birefringence characteristics. When an electric field is applied to a liquid crystal molecule, a direction of the liquid crystal molecule (a long axis direction or a short axis direction) is twisted, and its refractive index changes. In this way, by controlling the intensity of the electric field generated between the first electrode and the second electrode, the state of the first sub-grating unit is controlled, and the diffraction efficiency of the first sub-grating unit in the diffraction state is controlled.

For example, in at least one embodiment of the present disclosure, a material of the first spacer layer may be a transparent material, such as an organic transparent material. For example, the organic transparent material may be a polymer organic material, such as resin. For example, the resin may be epoxy resin or others.

In at least one embodiment of the present disclosure, there is no limitation on the preparation method of the first spacer layer and the first electro-optic material layer. For example, the first spacer layer and the first electro-optic material layer may be manufactured by using Polymer Dispersed Liquid Crystal (PDLC), which is an optical material formed by dispersing liquid crystal microdroplets in a solid polymer matrix (such as epoxy resin, etc.). For example, the liquid crystal cell where PDLC is located (e.g., the cell surrounded by the first electrode and the second electrode of the first control electrode) is exposed in an interference light path, and the light intensity of interference stripes changes periodically, so that liquid crystal microdroplets and polymer molecules will gather towards a region where the light is strong and a region where the light is weak, to form a "liquid crystal rich region" and a "polymer rich region". After curing, the liquid crystal and polymer are alternately arranged in layers. For example, in a case where the refractive indexes of liquid crystal and polymer are not equal, the refractive index of a structure formed by liquid crystal and polymer changes periodically to form a Bragg grating structure, and a light beam satisfying Bragg condition will diffract after incident. The diffraction efficiency of Bragg grating structure is related to a thickness of grating structure, refractive index modulation degree (for example, refractive index difference between liquid crystal and polymer). The diffraction efficiency may be designed according to the needs, which will not be repeated here.

Liquid crystal has two refractive indices, which are no, which is parallel to a long axis direction of a liquid crystal molecule, and ne, which is perpendicular to the long axis direction of the liquid crystal molecule. When a liquid crystal molecule rotates under the action of an electric field, the included angle between its long axis direction and the light propagation direction changes, so the effective refractive index of the liquid crystal molecule also changes between no and ne. For example, a variation range of the effective refractive index may be from 1.5 to 1.8. In order to switch the state of the grating unit (such as the first sub-grating unit) between the diffraction state and the non-diffraction state, it is necessary to adjust the refractive index of liquid crystal to be equal to that of polymer, so the refractive index of selected polymer material may be included in the variation range of liquid crystal refractive index, or the refractive index variation range of selected liquid crystal should include the refractive index of polymer material.

The light needs to propagate in the optical waveguide layer by total reflection, so the diffraction angle of the incident light after being diffracted by the guide-in structure (such as grating structure) needs to be greater than or equal to the total reflection angle. It is assumed that the maximum field angle of the incident light is $i_{max}$, the refractive index of the optical waveguide layer is n, and a grating period of a first grating (or the first sub-grating unit therein) is d. The total reflection angle of the optical waveguide layer is $\theta_0$=arcsin(1/n). A first-order diffraction angle of light with the incident angle $i_{max}$ after passing through the first grating is $\theta$=arcsin[$(\lambda/d-\sin i_{max})/n$], so in order to ensure $\theta \geq \theta_0$, the period d of the first grating should satisfy $\lambda/d-\sin i_{max} \geq 1$, wherein X is the wavelength of incident light. When the light propagates to the first grating, since the grating period of the first grating is the same as that of the guide-in structure, the diffraction angle of the light at the first grating is equal to the incident angle when entering the guide-in structure, so the light will emit into the human eye along a direction of original field angle.

For example, in at least one embodiment of the present disclosure, the material of the first control electrode may be a transparent electrode material to allow light to pass through. For example, the transparent electrode material may be indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO), carbon nanotube or other transparent conductive materials. For example, in at least one embodiment of the present disclosure, "transparent" may represent that the light transmittance is 50%-100%, such as further 75%-100%.

Figure 1E:
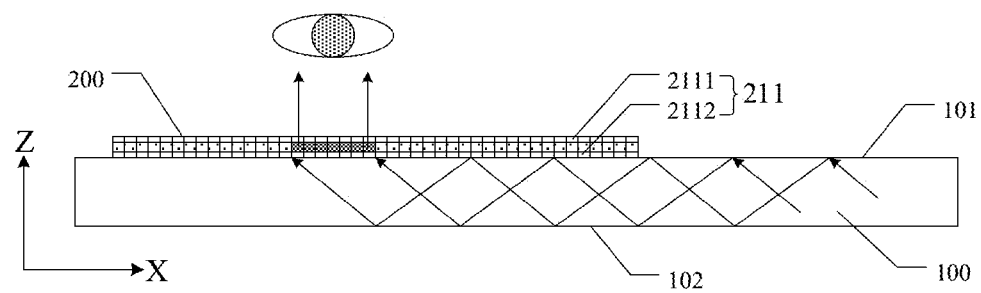
FIG. 1E illustrates a cross-sectional view of the optical waveguide element shown in FIG. 1A.

It should be noted that, in at least one embodiment of the present disclosure, as shown in FIG. 1A and FIG. 1B, the incident light will be totally reflected in the optical waveguide layer 100, that is, the light will be emitted to the first grating 200 in the way of total reflection, and the optical path of the incident light may be shown in FIG. 1E. For example, the optical waveguide layer 100 includes a first major surface 101 and a second major surface 102 which are opposite to each other, and light in the optical waveguide layer 100 are totally reflected on the first major surface 101 and the second major surface 102. For example, light may enter the optical waveguide layer 100 at a specific angle or light may enter the optical waveguide layer 100 and propagate in a specific direction, so that a reflection angle of light on the first major surface 101 and the second major surface 102 is not less than the critical angle of total reflection, thus satisfying the total reflection condition. For example, the guide-in structure in the following embodiments (e.g., the guide-in structure 400 shown in FIG. 5A) may be applied so that light can be totally reflected in the optical waveguide layer 100.

In the embodiment of the present disclosure, an arrangement of the first sub-grating units is not limited. For example, the first sub-grating units may be arranged in an array, or may be arranged in a row in parallel, or may be arranged in other arrangements according to requirements. In an embodiment of the present disclosure, the actual light-exiting region of the first grating may be an effective light-exiting region, or may include an effective light-exiting region and a non-effective light-exiting region, and the above different choices are related to the arrangements of the first sub-grating units. Next, in some embodiments, according to several different arrangements of the first sub-grating units, the working principle of the optical waveguide element will be explained.

Figure 5A:
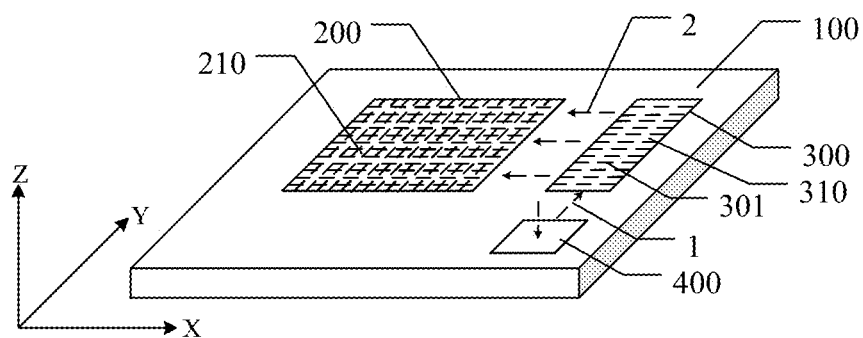
FIG. 5A illustrates a structural schematic diagram of another optical waveguide element provided by some embodiments of the present disclosure.
Figure 5B:
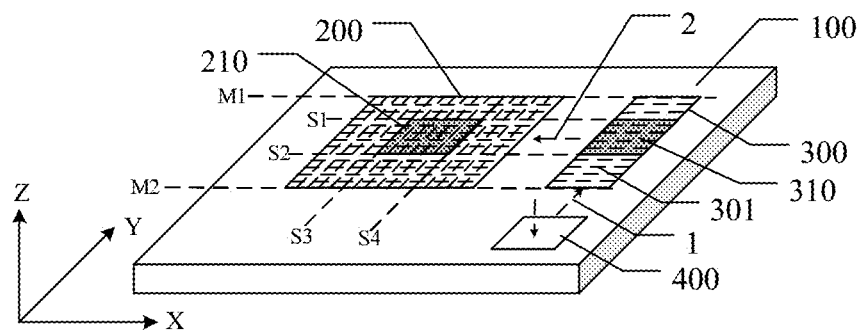
FIG. 5B illustrates a schematic diagram of the working principle of the optical waveguide element shown in FIG. 5A.

For example, in the optical waveguide element provided by at least one embodiment of the present disclosure, the first grating includes a plurality of first subregions arranged in a matrix, and each first subregion corresponds to one first sub-grating unit. For example, as shown in FIG. 1A, the first grating 100 includes a plurality of first subregions 201 arranged in a matrix, and each first subregion 201 is provided with one first sub-grating unit 210. For example, the dashed lines in FIG. 1A cross each other to form a virtual grid, and a mesh of the grid is the first subregion 201. The working principle of the optical waveguide element with the above structure may be referred to the relevant descriptions in the previous embodiments, which will not be repeated here. It should be noted that under the condition that a distribution range of the incident light along the Y-axis direction can be controlled, for example, the incident light may be concentrated in a region between S1 and S2 to be emitted to the first grating 200, all the light in the optical waveguide layer 100 may be concentrated in the effective light-exiting region defined by S1, S2, S3 and S4, that is, the actual light-exiting region in this case is the effective light-exiting region, thereby all the light guided out of the optical waveguide layer 100 can enter the human eye, utilization rate of light will be improved, and the brightness of the displayed image will be improved. For example, with respect to the regulation of the distribution range of the incident light along the Y-axis direction, reference may be made to the relevant description of the second grating in the following embodiment (as shown in FIG. 5B), which will not be repeated here.

For example, in the optical waveguide element provided by at least one embodiment of the present disclosure, at least one of a width and a length of each first subregion is less than or equal to the pupil diameter of the human eye. For example, the width and the length of each first subregion are less than or equal to the pupil diameter of the human eye. In this way, the effective light-exiting region (or pupil) may correspond to at least one first subregion, which is beneficial to adjust the accuracy of the effective light-exiting region, thereby improving the utilization rate of light. For example, as shown in FIG. 1B, the effective light-exiting region corresponding to the pupil includes a plurality of first sub-grating units 210. For example, by selecting the first sub-grating units 210, a plane shape of the effective light-exiting region may be made approximately circular, thereby improving the light utilization rate and the brightness of the displayed image. For example, a diameter of the circle may be 15 mm-25 mm, such as about 20 mm.

Figure 2:
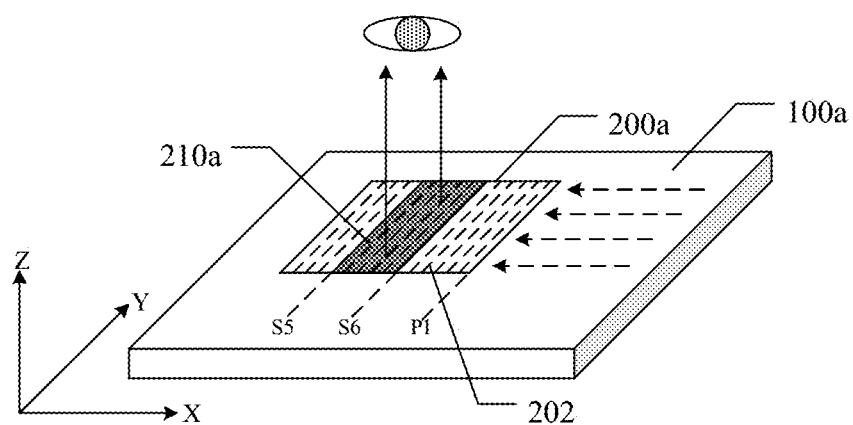
FIG. 2 illustrates a structural schematic diagram of another optical waveguide element provided by some embodiments of the present disclosure.

For example, in the optical waveguide element provided by at least one embodiment of the present disclosure, in a direction parallel to a plane where the optical waveguide layer is located, the first grating comprises a plurality of parallel first strip-shaped subregions, and each first strip-shaped subregion corresponds to one first sub-grating unit. For example, as shown in FIG. 2, the first grating 100a includes a plurality of parallel first strip-shaped subregions 202, and each first strip-shaped subregion 202 is provided with one first sub-grating unit 210a. For example, a region defined by the adjacent dashed lines in FIG. 2 is the first strip-shaped subregion 202. For example, for incident light emitted to the first grating 100a, a length direction (e.g., parallel to the Y axis) of the first strip-shaped subregion 202 is perpendicular to a propagation direction (e.g., parallel to the X axis) of the incident light. In this way, along the propagation direction of the incident light, the first grating 100a can adjust the position of the actual light-exiting region, so that the actual light-exiting region can correspond to the human eye (or pupil).

As shown in FIG. 2, dashed lines S5, S6, and P2 are parallel to the Y-axis, and the propagation direction of light (dashed arrows in the figure) emitted towards the first grating 200a in the X-Y plane is parallel to the X-axis. In a case, a region of the first grating 200 corresponding to the human eye (or its pupil) is located in a region defined by S5 and S6, and in the working mode, the first sub-grating unit 210a in the region defined by S5 and S6 is controlled to have the diffraction state to diffract light out of the optical waveguide layer 200a, while the first sub-grating unit 210a in other regions have the non-diffraction state and cannot diffract light out of the optical waveguide layer 100a. For example, the first sub-grating unit 210a in a region between S6 and P1 has the non-diffraction state, so light will not be emitted from the region between S6 and P1, that is, light emitted to the first grating 200a in the light guide plate will be concentrated in the region defined by S5 and S6 to be emitted out. In this way, at least in one-dimensional direction (X-axis direction as shown in the figure), the first grating 200a can control the position of the actual light-exiting region.

It should be noted that in the embodiment shown in FIG. 2, in a case where the distribution range of incident light along the Y-axis direction may be controlled, the actual light-exiting region of the first grating 200a may also be the actual light-exiting region shown in FIG. 1B, that is, in this case, all the light in the optical waveguide layer 100a are concentrated to the effective light-exiting region and emitted out, and the actual light-exiting region of the first grating 200a is the effective light-exiting region, thereby all the light guided out of the optical waveguide layer 100a can enter the human eye, utilization rate of light will be improved, and the brightness of the displayed image will be improved. For example, with respect to the regulation of the distribution range of the incident light along the Y-axis direction, reference may be made to the relevant description of a second grating in the following embodiment (as shown in FIG. 5B), which will not be repeated here.

For example, a structure of the first sub-grating unit 210b shown in FIG. 2 may be referred to the relevant description of the first sub-grating unit 210 in the embodiment shown in FIG. 1C, which will not be repeated here.

For example, in the optical waveguide element provided by at least one embodiment of the present disclosure, the width of each first strip-shaped subregion is less than or equal to the pupil diameter of the human eye. In this way, the effective light-exiting region (or pupil) may correspond to at least one first strip-shaped subregion, which is beneficial to adjust the accuracy of the effective light-emitting region, thereby improving the utilization rate of light and improving the brightness of the displayed image. For example, as shown in FIG. 2, the actual light-exiting region (including the effective light-exiting region) corresponding to the pupil includes a plurality of first sub-grating units 210a.

In at least one embodiment of the present disclosure, there is no limitation on a type of the first grating and a way in which the light is guided. For example, the first sub-grating units of the first grating in the diffraction state are equivalent to a reflection grating, a transmission grating, or a grating with both reflective and transmissive functions. In the following embodiments, several setting modes of the first grating will be explained according to different types of the first grating. In these embodiments, the optical waveguide layer comprises a first major surface and a second major surface which are opposite to each other, and the first major surface faces a display side of the optical waveguide element, that is, the first major surface faces the human eye, and the second major surface is located on a side of the first major surface facing away from the human eye.

For example, in some embodiments of the present disclosure, as shown in FIG. 1B and FIG. 1E, the optical waveguide layer 100 includes a first major surface 101 and a second major surface 102, and the first grating 200 is located on the first major surface 101. In this case, the first sub-grating units 210 of the first grating 200 are equivalent to a transmission grating when they are in the diffraction state, the light incident from the side of the first grating 200 facing the optical waveguide layer 100 is diffracted and then emitted from the other side of the first grating 200 facing away from the optical waveguide layer 100.

Figure 3A:
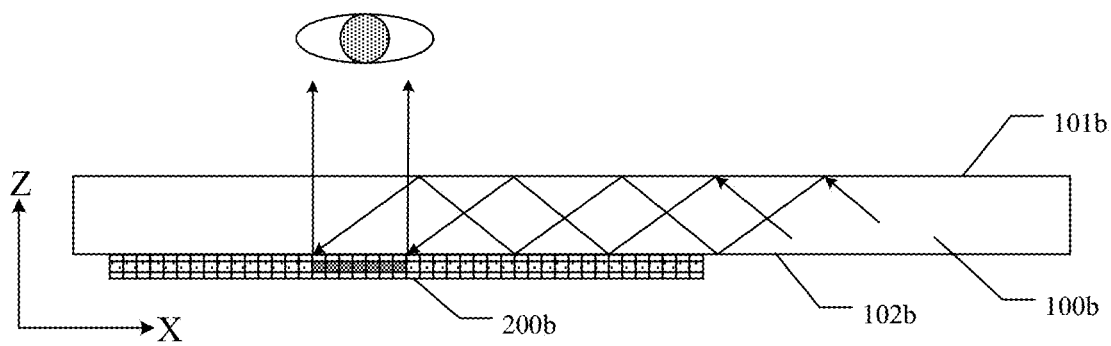
FIG. 3A illustrates a cross-sectional view of another optical waveguide element provided by some embodiments of the present disclosure.

For example, in other embodiments of the present disclosure, as shown in FIG. 3A, the optical waveguide layer 100b includes a first major surface 101b and a second major surface 102b, and the first grating 200b is located on the second major surface 102b. In this case, the first sub-grating units of the first grating 200b in the diffraction state are equivalent to a reflection grating, and the light incident from a side of the first grating 200b facing the optical waveguide layer 100b is diffracted and then emitted out from the side, and then the diffracted light passes through the second major surface 102b to enter the optical waveguide layer 100b and emitted from the first major surface 101b of the optical waveguide layer 100b.

Figure 3B:
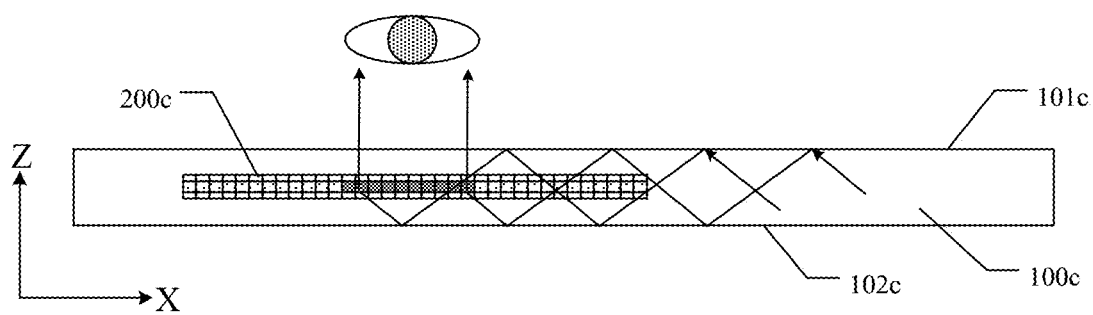
FIG. 3B illustrates a cross-sectional view of another optical waveguide element provided by some embodiments of the present disclosure.

For example, in other embodiments of the present disclosure, as shown in FIG. 3B, the optical waveguide layer 100c includes a first major surface 101c and a second major surface 102c, and the first grating 200c is located in the optical waveguide layer 100c, that is, the first grating 200c is located between the first major surface 101c and the second major surface 102c. In this case, when the first sub-grating units of the first grating 200c have the diffraction state, light incident from a side of the first grating 200c facing the first major surface 101c will pass through the first grating 200c to be emitted to the second major surface 102c. The light incident from the side of the first grating 200c facing the second major surface 102c will be diffracted and then emitted out from a side of the first grating 200c facing the first major surface 101c, and then emitted from the first major surface 101c of the optical waveguide layer 100c.

In an embodiment of the present disclosure, the first sub-grating unit may be equivalent to a transmission grating or a reflection grating when having the diffraction state. Taking the first sub-grating units as equivalent to Bragg grating when they are in the diffraction state as an example, when the light satisfying Bragg condition is incident on the grating, whether the light is diffracted in reflection or transmission in the Bragg grating depends on the relationship between a vector of incident light and a grating stripe vector.

Figure 3C:
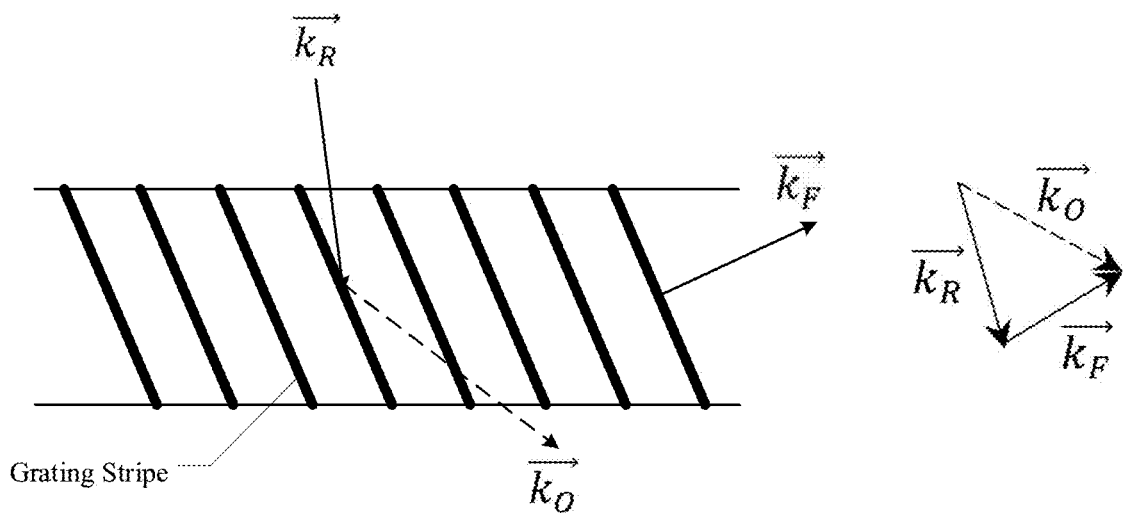
FIG. 3C illustrates a schematic diagram showing the principle of diffraction of light by the sub-grating unit of the optical waveguide element provided by some embodiments of the present disclosure.
Figure 3D:
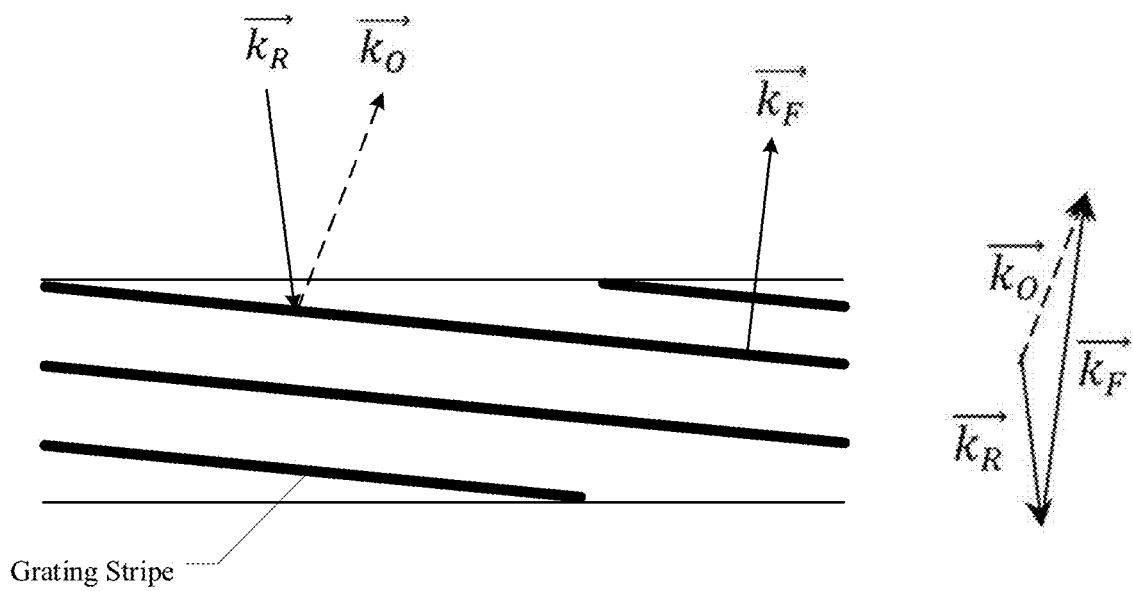
FIG. 3D illustrates a schematic diagram showing the principle of diffraction of light by a sub-grating unit of an optical waveguide element provided by some embodiments of the present disclosure.

For example, as shown in FIG. 3C and FIG. 3D, the incident light satisfying Bragg condition has an optical vector $\vec{K}_R$, $\vec{K}_R$ is equal to $2\pi/\lambda$, and $\lambda$ is the wavelength of light. The grating stripe vector is $\vec{K}_F$, a value of $\vec{K}_F$ is related to a spacing of the grating stripes and other parameters, which may be designed according to specific conditions. The light vector of diffracted light $\vec{K}_0$ is equal to a combined vector of the light vector of incident light $\vec{K}_R$ and the stripe vector $\vec{K}_F$. The grating stripe vector $\vec{K}_F$ is perpendicular to an extending direction of the grating stripe, so the value of the grating stripe vector $\vec{K}_F$ may be adjusted by adjusting parameters such as the spacing of the grating stripe, and a direction of the grating stripe vector $\vec{K}_F$ may be adjusted by adjusting an included angle between the grating stripe and the incident light (an inclination degree of the grating stripe), so that diffracted light can pass through the grating as shown in FIG. 3C, in this case, the grating is a transmission grating; or the diffracted light may be reflected as shown in FIG. 3D, that is, the grating is a reflection grating. For example, the grating stripes shown in FIG. 3C and FIG. 3D may be the first spacer strips 2121 of the first spacer layer 212 as shown in FIG. 1C. In this case, the first spacer strips 2121 may be set to be inclined (non-perpendicular) to a plane where the first electrode 2111 is located.

According to the above description, whether the grating (for example, the first sub-grating unit) reflects or transmits light is related to the incident direction of light in addition to its own parameters. For example, the first sub-grating units 210 of the first grating 200 shown in FIG. 1B and FIG. 1E are equivalent to a transmission grating when they are in the diffraction state, and the principle of the transmission grating may be referred to FIG. 3C. For example, the first sub-grating units of the first grating 200b shown in FIG. 3A are equivalent to a reflection grating when they are in the diffraction state, and the principle of the reflection grating may be referred FIG. 3D. It should be noted that the first grating 200c shown in FIG. 3B is a transmission grating when it has the diffraction state, and its structure may be the same as that of the first grating 200 shown in FIG. 1B. Since the included angles between the light emitted from the first major surface 101c and the second major surface 102c to the first grating 200c, and the first spacer strip (the grating stripe) of the first grating 200c are different, the light incident from the first major surface 101c may still be totally reflected on the second major surface 102c after passing through the first grating 200c, while the light incident from the second major surface 102c is diffracted out of the first major surface 101c after passing through the first grating 200c.

For example, in at least one embodiment of the present disclosure, in a case where the first grating is located in the optical waveguide layer, the optical waveguide layer may be arranged to include two sub-optical waveguide layers to sandwich the first grating. For example, an optical adhesive layer may be filled between the two sub-optical waveguide layers to fill a gap between the two sub-optical waveguide layers and a gap between the sub-optical waveguide layers and the first grating. For example, the refractive index of the optical adhesive layer is basically equal to the refractive index of a material of the optical waveguide layer.

Next, as shown in FIG. 1E, taking the first grating located on the first major surface of the optical waveguide layer as an example, in at least one of the following embodiments of the present disclosure, a optical waveguide element and a display method thereof, a display device and a display method thereof will be explained.

Figure 4:
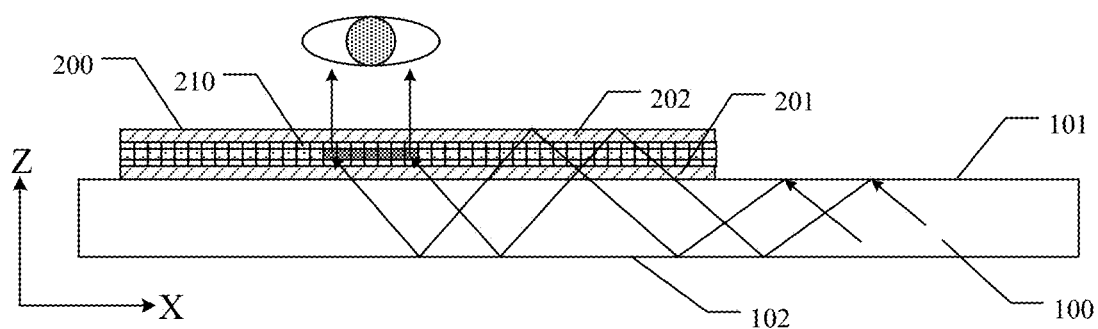
FIG. 4 illustrates a cross-sectional view of another optical waveguide element provided by some embodiments of the present disclosure.

For example, in at least one embodiment of the present disclosure, as shown in FIG. 4, the first grating 200 may include a first substrate 201 and a second substrate 202, and the first sub-grating unit 210 is located between the first substrate 201 and the second substrate 202. In this way, the first substrate 201 and the second substrate 202 may package the first sub-grating unit 210 to protect components (such as the first control electrode, photoelectric material, etc.) in the first sub-grating unit 210. In addition, in the manufacturing process of the first grating 200, the first substrate 201 and the second substrate 202 may serve as supporting members for forming electrodes of the first control electrode, and overflow of the photoelectric material and the like can be prevented.

For example, in at least one embodiment of the present disclosure, as shown in FIG. 4, the first substrate 201 is located between the first sub-grating unit 210 and the optical waveguide layer 100. In this way, the first substrate 201 may be provided to allow the light in the optical waveguide layer 100 pass through the first substrate 201, so that the light in the optical waveguide layer 100 can enter the first sub-grating unit 210. For example, the refractive index of the first substrate 201 is substantially equal to that of the optical waveguide layer 100. For example, further, the refractive indices of the first substrate 201, the second substrate 202, and the first spacer layer in the first sub-grating unit 210 are all equal, so that the light in the optical waveguide layer 100 is totally reflected on a surface of the second substrate 202 facing away from the first substrate 201 in a region where the first sub-grating unit 210 having the non-diffraction state is located. It should be noted that the refractive indices of the first substrate 201 and the second substrate 202 may be set according to actual needs, and are not limited to the above design, as long as the light in the optical waveguide layer 100 can pass through the first substrate 201 and can be reflected by the second substrate 202 after passing through the first sub-grating unit 210 with the non-diffraction state.

For example, the optical waveguide element provided by at least one embodiment of the present disclosure further includes a second grating, the second grating overlaps with the optical waveguide layer and includes a plurality of second sub-grating units, each second sub-grating unit is configured to be switchable between the diffraction state and the non-diffraction state, and the second sub-grating unit is configured to guide incident light in the optical waveguide layer from the optical waveguide layer to the first grating during the diffraction state. For example, as shown in FIG. 5A, the optical waveguide element includes an optical waveguide layer 100, a first grating 200 and a second grating 300, and the light incident on the optical waveguide element 100 is guided by the second grating 300 and then emitted to the first grating 200. The second grating 300 includes a plurality of second sub-grating units 310, and the second sub-grating units 310 can guide light to the first grating 200 only when they have the diffraction state. Therefore, by selecting the second sub-grating units 310 and controlling the selected second sub-grating units 310 to be in the diffraction state, the distribution of light guided out of the second grating 300 can be controlled, that is, the second grating 300 cooperates with the first grating 200, so that all the light in the optical waveguide layer 100 can be concentrated to the effective light-exiting region of the first grating 200 for emission, thereby improving the light utilization rate and the brightness of the displayed image.

For example, in the optical waveguide element provided by at least one embodiment of the present disclosure, in a direction parallel to a plane where the optical waveguide layer is located, the second sub-grating units in the diffraction state change a propagation direction of light from a first direction to a second direction by diffraction to emit the light towards the first grating. For example, as shown in FIG. 5A and FIG. 5B, the light emitted towards the second grating 300 along a first direction 1 is diffracted by the second sub-grating units 310 with the diffraction state, and then the light is emitted towards the first grating 200 along a second direction 2. For example, the first direction 1 is parallel to the Y-axis, and the second direction 2 is parallel to the X-axis.

For example, in the optical waveguide element provided by at least one embodiment of the present disclosure, the second grating is arranged into a plurality of second subregions along the first direction, each second subregion includes at least one second sub-grating unit, and each second subregion corresponds to at least one first sub-grating unit along the second direction. Each of the plurality of second subregions corresponds to the different first sub-grating unit, respectively. For example, as shown in FIG. 5B, along the first direction 1, the second grating 300 includes a plurality of side-by-side second subregions 301, and each second subregion 301 is provided with one second sub-grating unit 310. For example, in the second grating 300 shown in FIG. 5B, a region defined by the adjacent dashed lines is the second subregion 301.

For example, the second sub-grating unit 310 located between the dashed lines S1 and S2 of the second grating 300 is controlled to have the diffraction state, while other second sub-grating units 310 are controlled to have the non-diffraction state, after being diffracted by the second grating 300, the light emitted to the second grating 300 along the first direction 1 are concentrated in the region between S1 and S2 and then emitted to the first grating 200. In this case, the first sub-grating unit 210 located between S3 and S4 (or between S1, S2, S3 and S4) of the first grating 200 is controlled to have the diffraction state, while other first sub-grating unit 210 is controlled to have the non-diffraction state, so that the light in the optical waveguide layer 100 that are emitted towards the second grating 300 along the first direction 1 are concentrated in the region between S1, S2, S3 and S4 and emitted out, the light utilization rate is high, and the brightness of the displayed image is high. It should be noted that the region defined by S1, S2, S3 and S4 is an effective light-exiting region. For the description of the effective light-exiting region, reference can be made to the relevant descriptions in the previous embodiments, which will not be repeated here.

In at least one embodiment of the present disclosure, there is no limitation on a manner in which the second sub-grating unit is switched between the diffraction state and the non-diffraction state. For example, the state of the second sub-grating unit may be controlled by an electric field.

For example, in the optical waveguide element provided by at least one embodiment of the present disclosure, each second sub-grating unit includes a second control electrode to control the state of the second sub-grating unit, and the second control electrodes of each of the second sub-grating units are independent of each other. In this way, each second sub-grating unit can independently generate an electric field, and the electric fields of different second sub-grating units will not interfere with each other. The structure and relevant technology to set the control electrode to generate electric field are mature, which can reduce the difficulty and cost of design.

Figure 5C:
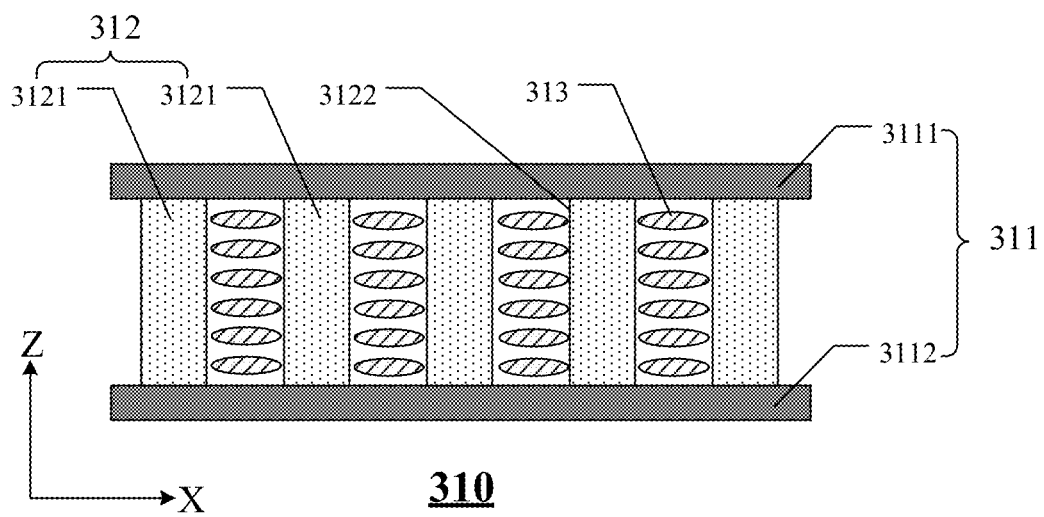
FIG. 5C illustrates a cross-sectional view of a second sub-grating unit in the optical waveguide element shown in FIG. 5A.
Figure 5D:
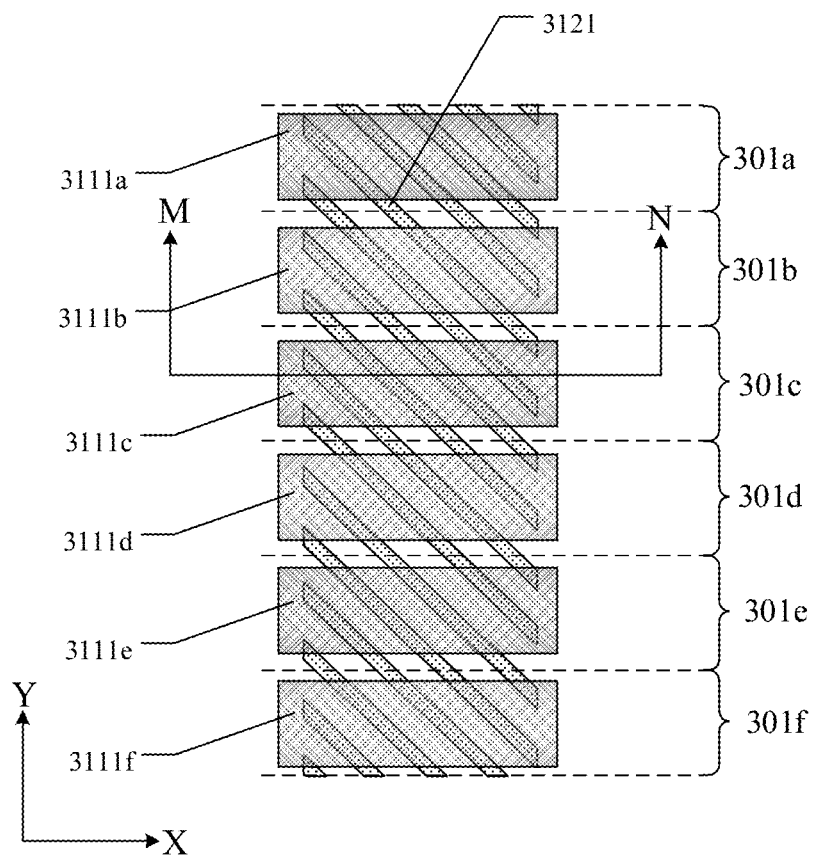
FIG. 5D illustrates a plan view of a second spacer layer of the second sub-grating unit shown in FIG. 5C.

For example, in the optical waveguide element provided by at least one embodiment of the present disclosure, the second sub-grating unit further includes a second spacer layer and a second electro-optic material layer. The second control electrode is configured to generate an electric field after being applied with a voltage to adjust the refractive index of the second electro-optic material layer. For example, as shown in FIG. 5C and FIG. 5D, the second control electrode 311 includes two opposite electrodes, a third electrode 3111 and a fourth electrode 3112. The second spacer layer 312 and the second electro-optic material layer 313 are located between the third electrode 3111 and the fourth electrode 3112. The second spacer layer 312 includes a plurality of second spacer strips 3121 spaced apart from each other. Two adjacent second spacer strips 3121 and the third electrode 3111 and the fourth electrode 3112 enclose a second chamber 3122. The electro-optic material of the second electro-optic material layer 313 is distributed in a plurality of second chambers 3122. For example, in a normal state, the refractive index of the electro-optic material is equal to (or substantially equal to) that of the second spacer layer 312, and the structure composed by the second spacer layer 312 and the second electro-optic material layer 313 has no diffraction effect. In a case where the third electrode 3111 and the fourth electrode 3112 generate an electric field, the refractive index of the electro-optic material is greater or less than that of the second spacer layer 312, so that the second electro-optic material layer 313 or the second spacer layer 312 is formed into a grating structure. For example, the grating structure may be a Bragg grating.

It should be noted that in the embodiments of the present disclosure, the relationship between the refractive index of the electro-optical material of the second electro-optical material layer and the refractive index of the second spacer layer is not limited to be equal in the normal state as described above. For example, in some embodiments of the present disclosure, in a normal state, the refractive index of the electro-optical material of the second electro-optical material layer and the refractive index of the second spacer layer are not equal to obtain a grating structure, so that the second sub-grating unit has a diffraction state; when the first electrode and the second electrode generate an electric field, the refractive index of the electro-optical material of the second electro-optical material layer is equal to the refractive index of the second spacer layer, so that the second sub-grating unit has a non-diffractive state. For example, in the case where the refractive index of the electro-optical material of the second electro-optical material layer is greater than the refractive index of the second spacer layer, the second electro-optical material layer is equivalent to a grating structure to have a diffraction effect, or in the case that the refractive index of the electro-optical material is less than the refractive index of the second spacer layer, the second spacer layer is equivalent to a grating structure to have a diffraction effect.

For example, in the optical waveguide element provided by at least one embodiment of the present disclosure, a plurality of second spacer strips of the second spacer layer are arranged along the first direction, and the second electro-optic material layer is distributed between the second spacer strips. A included angle between the second spacer strip and the first direction is equal to a included angle between the second spacer strip and the second direction, and a width of the second control electrode is equal to a width of the corresponding first sub-grating unit along the second direction. For example, as shown in FIG. 5B, FIG. 5C and FIG. 5D, the first direction 1 is parallel to the Y-axis, the second direction 2 is parallel to the X-axis, a plurality of second spacer strips 3121 are arranged along the Y-axis, and the included angles (acute angles) between an extending direction (length direction) of the second spacer strip 3121 and the X-axis and the Y-axis are both 45 degrees. In this way, the second sub-grating unit with the diffraction state can diffract the light that is emitted towards the second grating 300 in a direction parallel to the Y-axis, and make the propagation direction of the diffracted light parallel to the X-axis.

For example, in the optical waveguide element provided by at least one embodiment of the present disclosure, the second grating may be called a turning grating. In order to realize the deflection of the propagation direction of light in the optical waveguide layer, a grating vector of the grating has a certain angle $\alpha$ (for example, 45 degrees) with a coupled grating, and the propagation direction of light can be deflected by $2\alpha$ degrees without changing the total reflection propagation angle of light (that is, the incident angle of light on the first major surface and the second major surface of the optical waveguide layer). A grating period d1=d/cos(α), where d may be a grating period of the first grating (or the first sub-grating unit therein).

For example, as shown in FIG. 5D, a plurality of second subregions 301 may be subregions 301a, 301b, 301c, 301d, 301e, and 301f arranged in sequence, each of the above subregions is provided with one second sub-grating unit. FIG. 5D shows a third electrode of the second sub-grating unit, and a plurality of third electrodes include electrodes 3111a, 3111b, 3111c, 3111d, 3111e, and 3111f, which are sequentially located in the subregions 301a, 301b, 301c, 301d, 301e, and 301f. The second spacer strips 3121 may be distributed in a plurality of subregions, and accordingly, the second chambers of the second sub-grating units in adjacent subregions are communicated with each other. It should be noted that the second control electrodes, such as the third electrodes, of each of the second sub-grating units are spaced apart from each other, and even if a portion of the electro-optic material of adjacent second sub-grating units are communicated with each other, the adjacent second sub-grating units can still be independently controlled in state switching (switching between the diffraction state and the non-diffraction state).

Figure 5E:
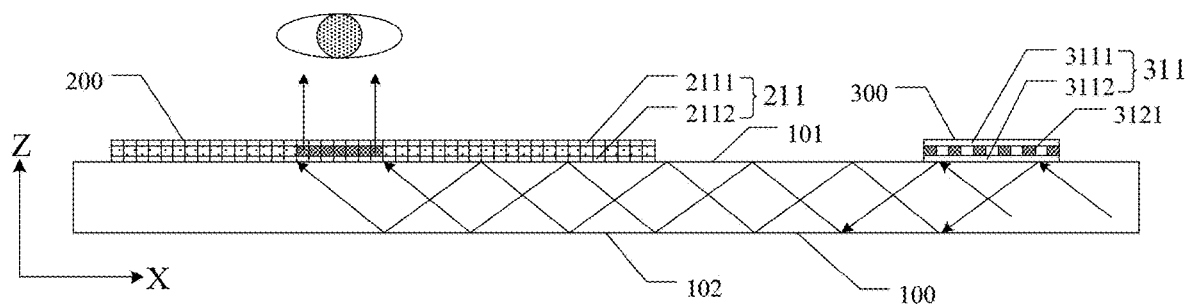
FIG. 5E illustrates a cross-sectional view of the optical waveguide element shown in FIG. 5A.

It should be noted that in at least one embodiment of the present disclosure, the second grating may be disposed on a surface of the optical waveguide layer 100 as shown in FIG. 5E. For example, the optical waveguide layer 100 includes a first major surface 101 and a second major surface 102, the first major surface 101 faces a display side of the optical waveguide element 100, that is, the first major surface 101 faces the human eye, and the second major surface 102 is located on a side of the first major surface 101 facing away from the human eye. The second grating 300 may be disposed on the first major surface 101 of the optical waveguide layer 100 as shown in FIG. 5E, or may be disposed on the second major surface 102, and the second sub-grating units of the second grating 300 in the diffraction state are equivalent to a reflection grating.

In the embodiment of the present disclosure, as long as the light diffracted by the second grating in the optical waveguide layer can be at least partially emitted to the first grating, the dimensional relationship between the first grating and the second grating will not be limited here. For example, as shown in FIG. 5B, orthogonal projections of the first grating 200 and the second grating 300 on the same major surface of the optical waveguide layer 100 have the same size along the first direction 1 and overlap along the second direction 2, that is, sizes of the first grating 200 and the second grating 300 along the Y-axis are both defined by two dashed lines M1 and M2 along the X-axis. In this way, the light diffracted by the second grating 300 can be emitted to any region of the first grating 200, so that any region of the first grating 200 has the ability to guide light out.

For example, in at least one embodiment of the present disclosure, under the condition that the light diffracted by the second grating can be emitted to the first grating, and under the condition that the first sub-grating units of the first grating are arranged in an array, the corresponding relationship between the first subregions of the first grating and the second subregions of the second grating is not limited. Hereinafter, several corresponding relationships between the first subregions and the second subregions will be described in several specific embodiments.

Figure 5F:
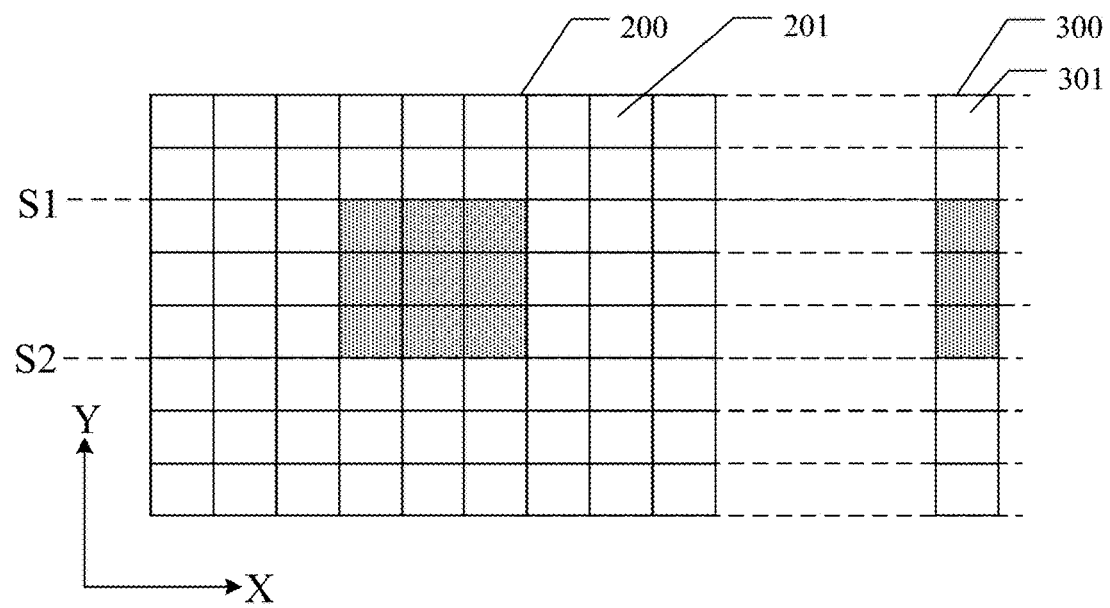
FIG. 5F illustrates a schematic diagram showing a corresponding relationship between subregions in the first grating and the second grating shown in FIG. 5B.

For example, in some embodiments of the present disclosure, along the second direction, one first subregion of the first grating corresponds to one second subregion of the second grating. For example, as shown in FIG. 5F, along the X-axis, one first subregion 201 of the first grating 200 corresponds to one second subregion 301 of the second grating 300, and the corresponding first subregion 201 and second subregion 301 have the same size along the Y-axis, and their positions in the Y-axis direction are defined by the same two dashed lines. In this way, the dashed lines S1 and S2 that define the actual light-exiting region (a shaded region in the figure, reference may be made to the relevant description in FIG. 5B) are located at a junction between the first subregions 201 (the first sub-grating units therein).

Figure 5G:
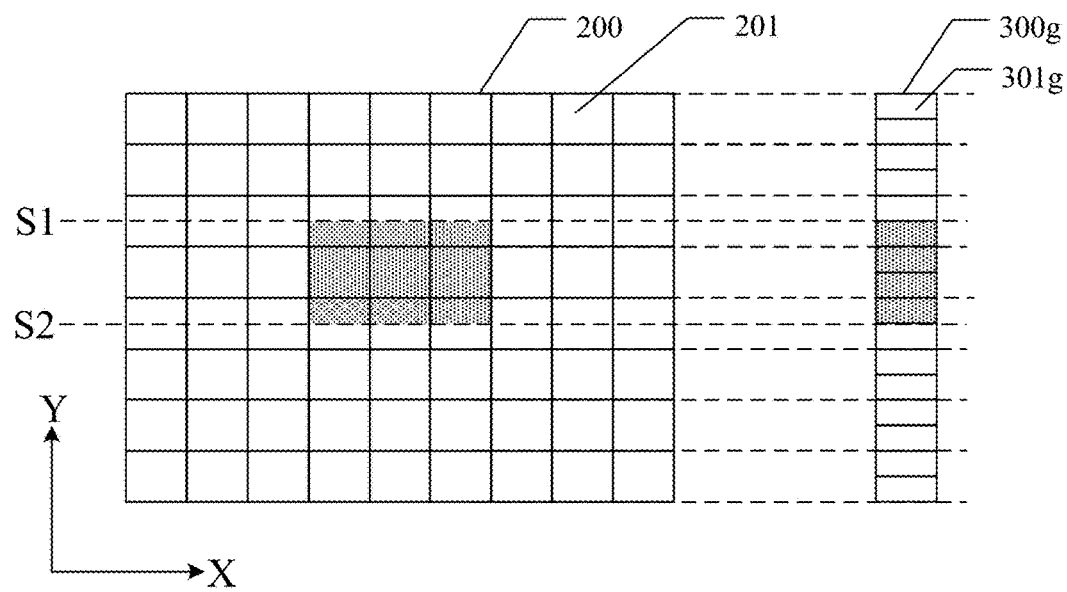
FIG. 5G illustrates a schematic diagram showing a corresponding relationship between subregions in the first grating and the second grating shown in FIG. 5B.

For example, in some embodiments of the present disclosure, one first subregion of the first grating corresponds to a plurality of second subregions of the second grating along the second direction, so that a size and a position of the light-exiting region of the first grating can be adjusted, and the accuracy of the effective light-exiting region can be improved. For example, as shown in FIG. 5G, along the X-axis, one first subregion 201 of the first grating 200 corresponds to two second subregions 301g of the second grating 300g, and a size of the first subregion 201 in the Y-axis direction is twice that of the corresponding second subregion 301g in the Y-axis direction. In the Y-axis direction, positions of the first subregion 201 and the two corresponding second subregions 301g are defined by the same two dashed lines. As shown in FIG. 5B, a half region of each of some first subregions 201 can guide light out, that is, the dashed lines S1 and S2 that define the actual light-exiting region (a shaded region in the figure, reference may be made to the relevant description in FIG. 5B) may locate in a portion of the first subregions 201 (the first sub-grating units therein).

It should be noted that in each grating, if a distribution range of the sub-grating units in the diffraction state is large, the diffraction efficiency of the sub-grating units may be set to be gradually increased along the propagation direction of light, so that the distribution of emitted light is uniform. For example, as shown in FIG. 5B, along the second direction 2, the diffraction efficiency of a plurality of first sub-grating units 210 in the region defined by S1, S2, S3 and S4 gradually increases, and along the first direction 1, the diffraction efficiency of a plurality of second sub-grating units 310 in the region defined by S1 and S2 gradually increases. In this way, the light emitted from the region defined by S1, S2, S3 and S4 can be uniformly distributed.

For example, the optical waveguide element provided by at least one embodiment of the present disclosure may further include a guide-in structure, which may guide light into the optical waveguide layer and make the light emit towards the second grating along the first direction. It should be noted that the "guiding light into the optical waveguide layer" means that the light may be totally reflected on the major surface of the optical waveguide layer. For example, as shown in FIG. 5A and FIG. 5B, the light outside the optical waveguide layer 100 are emitted towards the optical waveguide layer 100 and the guide-in structure 400 along the Z-axis, and the guide-in structure 400 converts a direction of the light from being parallel to the Z-axis to being emitted towards the second grating 300 along the direction parallel to the Y-axis (the first direction 1) in the optical waveguide layer 100 by means of total reflection.

Figure 6A:
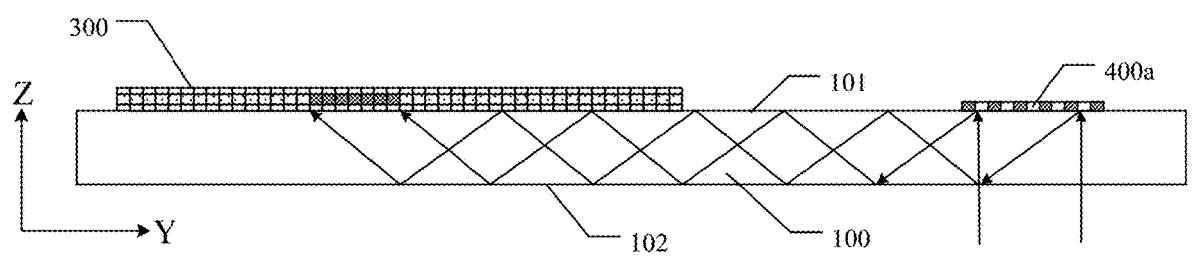
FIG. 6A illustrates a cross-sectional view of another optical waveguide element provided by some embodiments of the present disclosure.

For example, in some embodiments of the present disclosure, as shown in FIG. 6A, the guide-in structure 400a is located on a surface of the optical waveguide layer 100 and is set as a grating structure, and by setting parameters of the grating structure (such as, a diffraction angle), the diffracted light can be totally reflected on the first major surface 101 and the second major surface 102. It should be noted that the grating structure may be set as a reflection grating or a transmission grating according to requirements. For example, as shown in FIG. 6A, the guide-in structure 400a is located on the first major surface 101 of the optical waveguide layer 100, and external light is emitted from a side of the second major surface 102 of the optical waveguide layer 100 towards the guide-in structure 400a. In this case, the guide-in structure 400a is set as a reflection grating. For example, if the guide-in structure 400a in FIG. 6A is located on the second major surface 102, in this case, the guide-in structure 400a is set as a transmission grating.

Figure 6B:
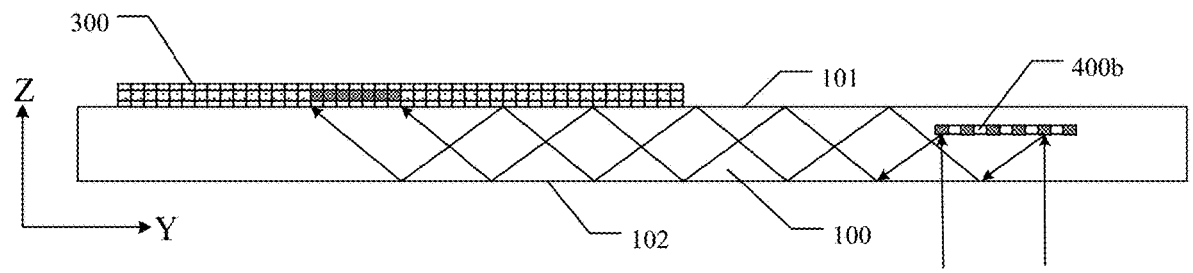
FIG. 6B illustrates a cross-sectional view of another optical waveguide element provided by some embodiments of the present disclosure.

For example, in other embodiments of the present disclosure, as shown in FIG. 6B, the guide-in structure 400b is located in the optical waveguide layer 100 and set as a grating structure, and by setting parameters of the grating structure (such as the diffraction angle), the diffracted light can be totally reflected on the first major surface 101 and the second major surface 102. It should be noted that the grating structure may be set as a reflection grating or a transmission grating according to requirements. For example, the guide-in structure 400b shown in FIG. 6B is configured as a reflection grating. The setting mode of the guide-in structure 400b in the optical waveguide layer 100 may refer to the relevant description of the setting mode of the first grating in the embodiments shown in FIG. 3B, which will not be repeated here.

Figure 6C:
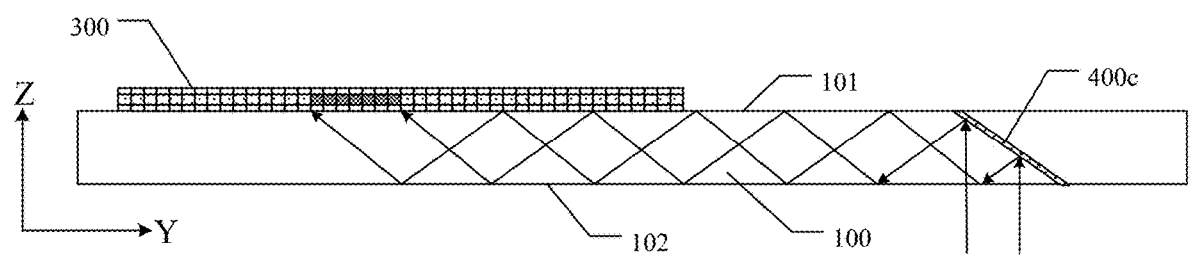
FIG. 6C illustrates a cross-sectional view of another optical waveguide element provided by some embodiments of the present disclosure.

For example, in other embodiments of the present disclosure, as shown in FIG. 6C, the guide-in structure 400c is located in the optical waveguide layer 100 and set as a mirror. The mirror is inclined with respect to the first optical waveguide layer 100, and by controlling an inclination degree of the mirror, a reflection angle of the light on the mirror can be adjusted, so that the reflected light can be totally reflected on the first major surface 101 and the second major surface 102 of the optical waveguide layer 100. For example, the optical waveguide layer 100 may be include a plurality of sub-optical waveguides, and the guide-in structure 400c is sandwiched between two sub-optical waveguides.

Figure 7:
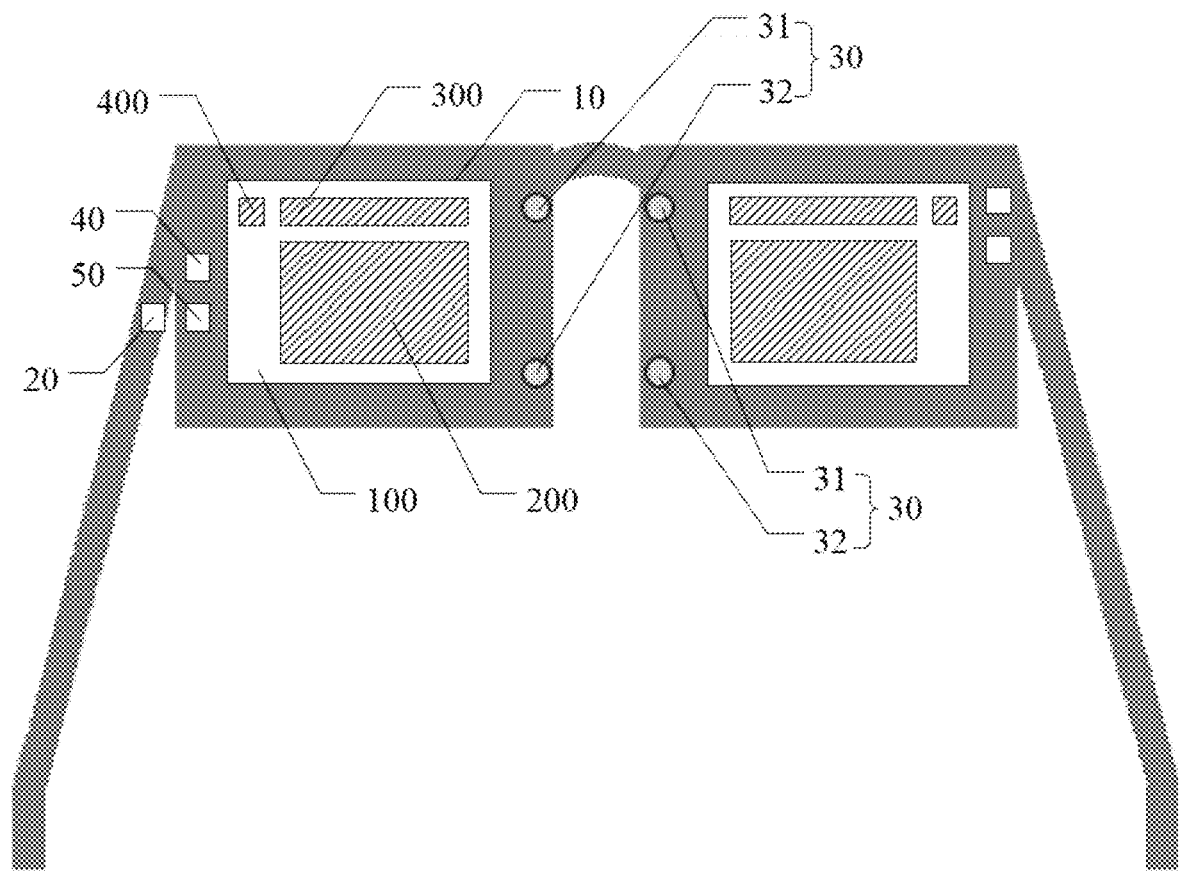
FIG. 7 illustrates a schematic structural diagram of a display device provided by some embodiments of the present disclosure.

At least one embodiment of the present disclosure provides a display device including the optical waveguide element provided by any of the above embodiments. For example, the display device is an Augmented Reality (AR) display device. For example, as shown in FIG. 7, the display device is AR glasses, and the optical waveguide element 10 is a lens of AR glasses.

For example, the display device provided by at least one embodiment of the present disclosure further includes an image providing device configured to provide light to the optical waveguide for displaying an image. For example, as shown in FIG. 7, the image providing device 20 is located on a frame or a leg of AR glasses. The image providing device 20 emits light carrying image information to the guide-in structure 400 of the optical waveguide element 10, and the light is finally guided into the human eye through the first grating 200. For example, the image providing device 20 may be a projection device. For example, after the light beam with image information emitted from the projection device enters the optical waveguide layer 100 through the guide-in structure 400, the light beam is diffracted by the second grating 300 and the first grating 200 in turn as shown in FIG. 5B, so that the light beam is concentrated in the effective light-exiting region defined by S1, S2, S3 and S4 to be emitted out so as to enter the human eye, so that the user can see the environment image through the optical waveguide element (the optical waveguide layer, the first grating and the second grating, etc.) and observe the virtual image provided by the projection device at the same time.

For example, the display device provided by at least one embodiment of the present disclosure further includes a tracking device and an information processing unit. The tracking device is configured to detect a position and an observation direction of a pupil. The information processing unit is configured to determine the observation range of the pupil according to the position and the observation direction of the pupil, thereby determining a first sub-grating unit corresponding to the observation range of the pupil. For example, as shown in FIG. 7, the tracking device 30 and the information processing unit 40 are located on the frame of the AR glasses. For example, the tracking device 30 may include an infrared light source and an infrared detector. The infrared light emitted from the infrared light source illuminates the eyes (pupils), and the infrared detector detects an image that is under infrared light illumination. The information processing unit 40 may include a processor, a storage, etc., and may convert the optical signal of the tracking device 30 into an electrical signal and perform calculation processing, so as to obtain relative coordinates of the pupil of human eye corresponding to the optical waveguide element 10 (for example, the first grating 200), and determine a region of the first grating 200 within the observation range of the pupil according to the observation direction of the pupil, and the region is an effective light-exiting region. For example, as shown in FIG. 7, the tracking device 30 may include two infrared light sources and two infrared detectors to detect the pupils of the left and right eyes respectively.

Figure 8:
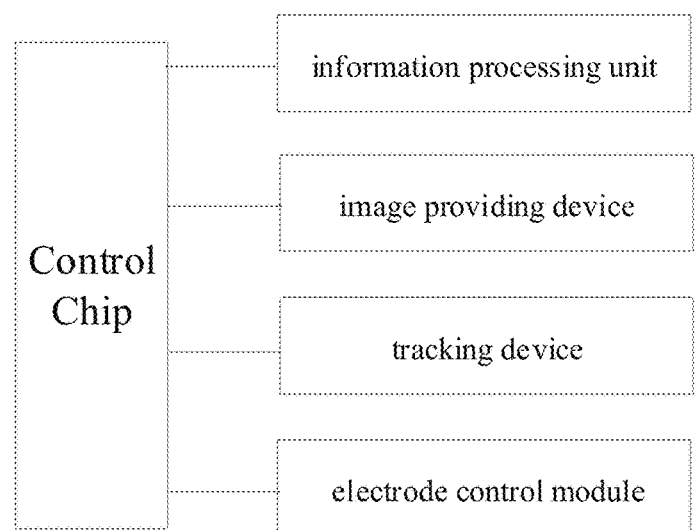
FIG. 8 illustrates a schematic block diagram of a display device provided by some embodiments of the present disclosure.

For example, the display device provided by at least one embodiment of the present disclosure further includes a control chip, which is configured to connect with the information processing unit and apply a control signal to the first sub-grating units of the first grating, respectively. For example, as shown in FIG. 7 and FIG. 8, the control chip 50 may be located on the frame of AR glasses, and the control chip 50 is connected with the information processing unit 40. For example, the control chip 50 may also be connected with the image providing device 20, the tracking device 30 and an electrode control module, and the electrode control module may include a driving circuit to control the voltage of the electrode of the first grating (and/or the second grating). In this way, the control chip 50 can control switches of the image providing device 20, the tracking device 30 and the information processing unit 40 and receive relevant information, so as to control the first sub-grating units of the first grating 200 located in the effective light-exiting region to be in the diffraction state, and also control the second sub-grating units of the second grating 300 corresponding to the effective light-exiting region (for example, corresponding to the second direction 2 shown in FIG. 5B) to be in the diffraction state.

For example, the control chip may be a central processing unit, a digital signal processor, a single chip microcomputer, a programmable logic controller, etc. For example, the control chip may also include a storage, a power supply module, etc., and the functions of power supply and signal input and output may be achieved through additionally arranged wires and signal lines. For example, the control chip may also include hardware circuits and computer executable codes. Hardware circuits may include conventional VLSI circuits or gate arrays and existing semiconductors or other discrete components such as logic chips and transistors. Hardware circuits may also include field programmable gate array, programmable array logic, programmable logic device, and the like.

At least one embodiment of the present disclosure provides a control method of an optical waveguide element, wherein the optical waveguide element comprises an optical waveguide layer and a first grating, the first grating overlaps with the optical waveguide layer and includes a plurality of first sub-grating unit, the first sub-grating units are configured to be switchable between a diffraction state and a non-diffraction state. The method comprises: controlling the first sub-grating unit of the first grating corresponding to an observation range of a pupil to be converted to be in a diffraction state, to guide incident light in the optical waveguide layer out of the optical waveguide layer to enter the pupil; and controlling a first sub-grating unit of the first grating not corresponding to the observation range of the pupil to be converted into a non-diffraction state. In this way, the first grating can concentrate the light to the first sub-grating unit with the diffraction state to guide the light out of the optical waveguide element, thus getting more light into the human eye, improving the utilization rate of light and improving the brightness of the displayed image. In the above control method, a structure of the optical waveguide element may refer to the relevant descriptions in the above embodiments (for example, the embodiments shown in FIG. 1A-1E, FIG. 2, FIG. 3A, FIG. 3B and FIG. 4), which will not be repeated here.

For example, in the control method provided by at least one embodiment of the present disclosure, the second grating comprises a plurality of second sub-grating units, in a direction parallel to a plane of the optical waveguide layer is located, the second sub-grating units are configured to diffract light propagating in a first direction to travel in a second direction, so as to enter the first grating. The control method comprises: controlling a second sub-grating unit that corresponds to a first sub-grating unit having a diffraction state along the second direction to be converted to be in a diffraction state, and controlling other second sub-grating units to be converted to be in a non-diffraction state. In this way, by selecting the second sub-grating unit and controlling the selected second sub-grating unit to be in a diffraction state, the distribution of light guided from the second grating can be controlled, that is, with the cooperation of the second grating and the first grating, all light in the optical waveguide layer can be concentrated in the effective light-exiting region of the first grating to be emitted, so that the light utilization rate is high and the brightness of the displayed image is high. In the above control method, the structure of the optical waveguide element may refer to the relevant descriptions in the above embodiments (for example, the embodiments shown in FIG. 5A to 5E), which will not be repeated here.

Figure 9:
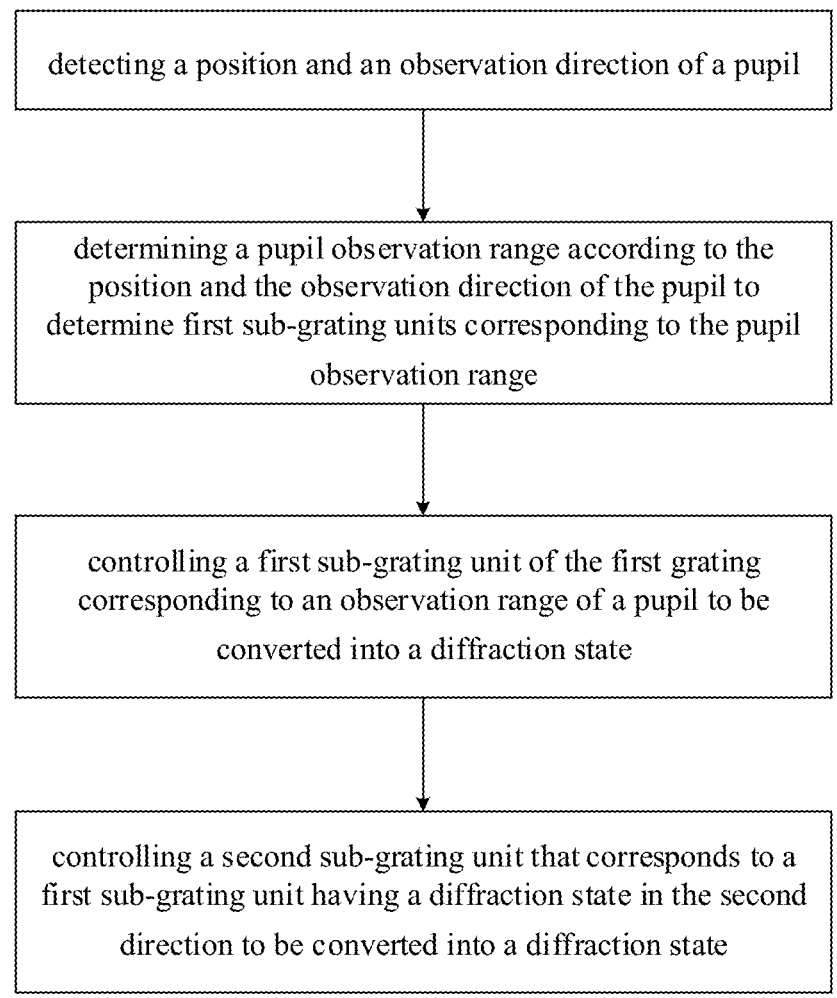
FIG. 9 illustrates a schematic structural diagram of a display device provided by some embodiments of the present disclosure.

At least one embodiment of the present disclosure provides a display method of the display device according to any of the above embodiments, the display device includes a tracking device and an information processing unit, as shown in FIG. 9, the display method includes: detecting a position and an observation direction of a pupil by using the tracking device in real time; processing detection information of the tracking device by using the information processing unit, to determine an observation range of the pupil in real time; controlling a first sub-grating unit of the first grating corresponding to the observation range of the pupil to be converted into a diffraction state, to guide incident light in the optical waveguide layer out of the optical waveguide layer to enter the pupil; and controlling a first sub-grating unit in the first grating that does not correspond to the observation range of the pupil to be converted into a non-diffraction state. In this way, a region where the first grating is located within the observation range of the pupil (the effective light-exiting region) may be determined, and the first sub-grating unit in the region may be controlled to have a diffraction state, so that the first grating can concentrate the light into the first sub-grating unit with a diffraction state to guide the light out of the optical waveguide element, thus getting more light into the human eye, improving the utilization rate of light and improving the brightness of the displayed image. In the above control method, the structure of the display device may refer to the relevant descriptions in the above embodiments (for example, the embodiments shown in FIG. 7 and FIG. 8), which will not be repeated here.

In the optical waveguide element and the control method thereof, the display device and the display method thereof provided by at least one embodiment of the present disclosure, the first grating in the optical waveguide element includes a plurality of first sub-grating units which are capable of being switched between the diffraction state and the non-diffraction state, so that a position of a diffraction region of the first grating can be selected to regulate a position of the light-exiting region of the optical waveguide element, that is, the light is concentrated in the selected light-exiting region to enter the eyes of users, thereby improving the utilization rate of light.

For the present disclosure, the following statements should be noted:

(1) The accompanying drawings of the present disclosure involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or reduced, that is, the accompanying drawings are not drawn according to the actual scale.

(3) In case of no conflict, features in one embodiment or in different embodiments may be combined to obtain a new embodiment.

What are described above is related to the specific embodiments of the present disclosure only and not limitative to the scope of the disclosure. The protection scope of the disclosure shall be based on the protection scope of the claims.

The application claims priority to the Chinese patent application No. 201910424358.X, filed May 21, 2019, the disclosure of which is incorporated herein by reference as part of the application.

What is claimed is:

1. An optical waveguide element, comprising:
   an optical waveguide layer;
   a first grating, overlapping with the optical waveguide layer and comprising at least one first sub-grating unit;
   wherein the at least one first sub-grating unit is configured to be switchable between a diffraction state and a non-diffraction state, and the at least one first sub-grating unit in a diffraction state guides incident light in the optical waveguide layer out of the optical waveguide layer for display,
   a plurality of first sub-grating units are provided, each of the plurality of first sub-grating units comprises a first control electrode to control a state of the first sub-grating unit, and the first control electrodes of at least two of the plurality of first sub-grating units are independent of each other, wherein
   a diffraction efficiency of the plurality of first sub-grating units are set to be gradually increased along a propagation direction of light in the optical waveguide layer.

2. The optical waveguide element according to claim 1, wherein
the first control electrodes of the plurality of first sub-grating units are independent of each other.

3. The optical waveguide element according to claim 1, wherein
in a direction parallel to a plane where the optical waveguide layer is located, the first grating comprises a plurality of first strip-shaped subregions which are parallel, and each of the plurality of first strip-shaped subregions corresponds to one of the plurality of first sub-grating units.

4. The optical waveguide element according to claim 3, wherein
a width of each of the plurality of first strip-shaped subregions is less than or equal to a pupil diameter of a human eye.

5. The optical waveguide element according to claim 1, wherein
the first grating comprises a plurality of first subregions arranged in a matrix, and each of the plurality of first subregions corresponds to one of the plurality of first sub-grating units.

6. The optical waveguide element according to claim 5, wherein
at least one of a width and a length of each of the plurality of first subregions is less than or equal to a pupil diameter of a human eye.

7. The optical waveguide element according to claim 1, wherein
the first control electrode comprises a first electrode and a second electrode which are opposite to each other, and each of the plurality of the first sub-grating units further comprises a first spacer layer and a first electro-optic material layer between the first electrode and the second electrode,
the first spacer layer comprises a plurality of first spacer strips, to define a plurality of first chambers with the first electrode and the second electrode, and the first electro-optical material layer fills the plurality of first chambers, and
the first electrode and the second electrode are configured to generate an electric field after being applied with a voltage, to adjust a refractive index of the first electro-optical material layer.

8. The optical waveguide element according to claim 1, further comprising:
a second grating, overlapping with the optical waveguide layer and comprising a plurality of second sub-grating units;
wherein each of the plurality of second sub-grating units is configured to be switchable between a diffraction state and a non-diffraction state, and each of the plurality of second sub-grating units is configured to guide the incident light in the optical waveguide layer from the optical waveguide layer to the first grating under a condition of being in the diffraction state.

9. The optical waveguide element according to claim 8, wherein
in a direction parallel to a plane where the optical waveguide layer is located, each of the plurality of second sub-grating units in the diffraction state changes a propagation direction of light from a first direction to a second direction by diffraction, to emit the light towards the first grating, wherein the first direction is perpendicular to the second direction.

10. The optical waveguide element according to claim 9, wherein
along the first direction, the second grating is provided with a plurality of second subregions, each of the plurality of second subregions comprises at least one of the plurality of second sub-grating units,
along the second direction, each of the plurality of second subregions corresponds to the at least one of the plurality of first sub-grating units, and each of the plurality of second subregions corresponds to the first sub-grating unit which is different with the first sub-grating unit which corresponds to other of the plurality of second subregions.

11. The optical waveguide element according to claim 9, wherein
each of the plurality of second sub-grating units comprises a second control electrode, a second spacer layer and a second electro-optic material layer, wherein the second spacer layer comprises a plurality of second spacer strips arranged along the first direction, the second electro-optic material layer is distributed between the second spacer strips,
an included angle between the second spacer strips and the first direction, and an included angle between the second spacer strips and the second direction are equal, and along the second direction, a width of the second control electrode is equal to a width of the first sub-grating unit which corresponds to the second control electrode.

12. The optical waveguide element according to claim 10, wherein the first grating comprises a plurality of first subregions arranged in an array, each of the plurality of first subregions corresponds to one of the plurality of first sub-grating units, the first grating is a two-dimensional grating and the second grating is a one-dimensional grating.

13. A display device, comprising the optical waveguide element according to claim 1.

14. The display device according to claim 13, further comprising an image providing device, wherein
the image providing device is configured to provide light to the optical waveguide for displaying an image.

15. The display device according to claim 13, further comprising:
a tracking device, configured for detecting a position and an observation direction of a pupil;
an information processing unit, configured for determining an observation range of a pupil according to the position and the observation direction of the pupil, to determine the first sub-grating units corresponding to the observation range of the pupil.

16. The display device according to claim 15, further comprising a control chip, wherein
the control chip is configured to be in signal connection with the information processing unit and apply a control signal to the plurality of first sub-grating units of the first grating, respectively.

17. The display device according to claim 15, further comprising:
an electrode control module, comprising a driving circuit and configured to control voltage of electrode of the first grating and/or the second grating;
a control chip, connected with the tracking device, the image providing device, the information processing unit and the electrode control module, and receiving signal from the information processing unit and controlling the electrode control module, to control the first sub-grating unit of the first grating located in an effective light-exiting region to be in a diffraction state, and control the second sub-grating unit of the second grating corresponding to the effective light-exiting region to be in a diffraction state.

18. A display method of the display device according to claim 13, wherein the display device comprises a tracking device and an information processing unit, and the display method comprises:

detecting a position and an observation direction of a pupil by using the tracking device in real time;

processing detection information of the tracking device by using the information processing unit to determine an observation range of the pupil in real time;

controlling the first sub-grating unit of the first grating corresponding to the observation range of the pupil to be converted to be in a diffraction state, to guide incident light in the optical waveguide layer out of the optical waveguide layer to enter the pupil; and controlling the first sub-grating unit in the first grating that does not correspond to the observation range of the pupil to be converted to be in a non-diffraction state.

\* \* \* \* \*